United States Patent [19]

Jensen

[11] Patent Number: 4,610,739

[45] Date of Patent: Sep. 9, 1986

[54] METHOD AND DEVICE FOR PROVIDING LONGITUDINAL AND LATERAL STRETCH CONTROL IN LAMINATED WEBS

[75] Inventor: James W. Jensen, Boulder, Colo.

[73] Assignee: Adolph Coors Company, Golden, Colo.

[21] Appl. No.: 667,869

[22] Filed: Nov. 2, 1984

[51] Int. Cl.⁴ .................. B32B 31/08; G01B 21/06
[52] U.S. Cl. ...................... 156/64; 156/324; 156/361; 226/3; 226/15; 226/21
[58] Field of Search .............. 156/64, 324, 361; 226/2, 3, 15, 16, 17, 21

[56] References Cited

U.S. PATENT DOCUMENTS

| | | | |
|---|---|---|---|
| 3,701,464 | 10/1972 | Crum | 226/3 |
| 3,774,271 | 11/1973 | Depuy et al. | 226/15 X |
| 4,054,251 | 10/1977 | Henderson et al. | 226/15 X |
| 4,135,664 | 1/1979 | Resh | 226/3 X |
| 4,243,167 | 1/1981 | Sander | 226/21 |
| 4,254,173 | 3/1981 | Peer, Jr. | 428/204 |
| 4,316,566 | 2/1982 | Arleth et al. | 226/2 |
| 4,322,026 | 3/1982 | Young, Jr. | 226/15 |
| 4,392,910 | 7/1983 | Tokuno et al. | 156/361 |
| 4,496,417 | 1/1985 | Haake et al. | 156/361 |

FOREIGN PATENT DOCUMENTS 622827 5/1949 United Kingdom .................. 226/3

Primary Examiner—Robert A. Dawson
Attorney, Agent, or Firm—Klaas & Law

[57] ABSTRACT

A method and apparatus for monitoring and controlling the longitudinal and lateral deformation and the lateral position of a moving web of plastic film material which is laminated to a moving web of paper material to form a laminated composite.

50 Claims, 15 Drawing Figures

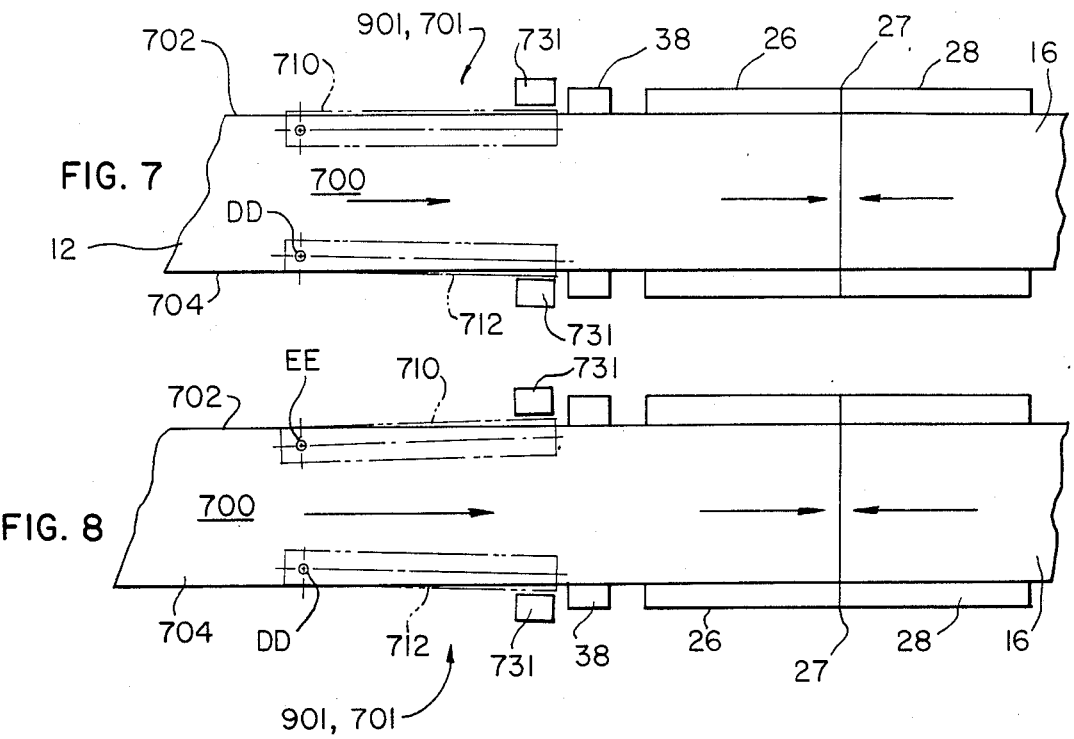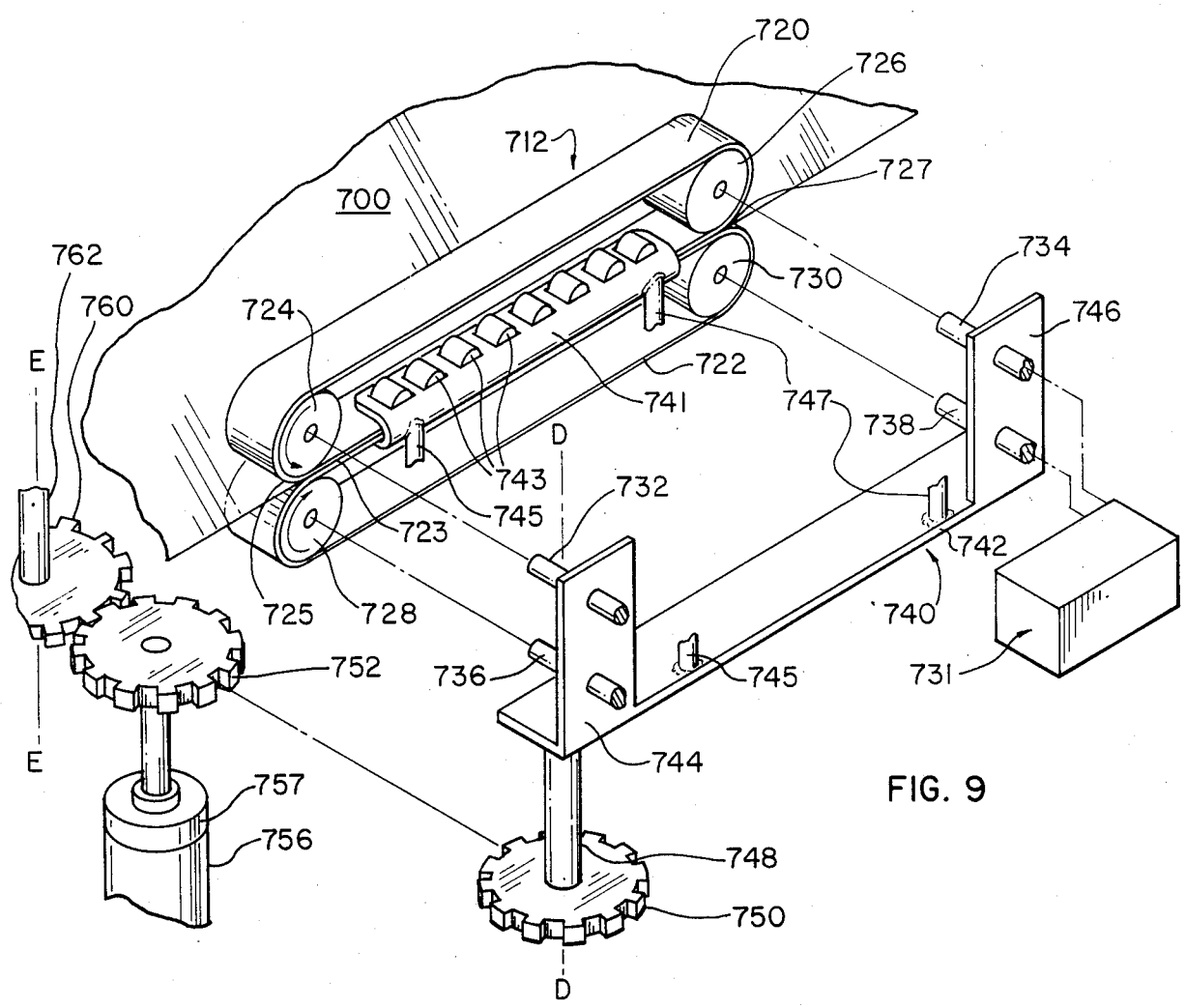

METHOD AND DEVICE FOR PROVIDING LONGITUDINAL AND LATERAL STRETCH CONTROL IN LAMINATED WEBS

BACKGROUND OF THE INVENION

The present invention relates generally to the production of laminated paper products and more particularly to a method of lamination and a device for laminating a continuous roll of extensible plastic film material to a continuous roll of paper backing material wherein the device has a system for controlling the amount of distortion in the plastic film material to ensure proper registry of the film material with the paper material.

Lamination of a plastic film material to a paper material has been found to be particularly advantageous where paper products having high strength and abrasion resistant qualities are required. Such laminated composites are particularly desirable in the packaging industry where artwork may be printed on the interior side of the plastic film to produce a high quality display package. The construction and use of such laminated composites are described in Peer U.S. Pat. No. 4,254,173, which is hereby incorporated by reference.

In producing a laminated composite of the type described in Peer, both the plastic film material and the paper material may be provided in continuous sheets, usually referred to as "webs," which are mounted on spools. The paper and the plastic film generally pass over a number of roller type devices where each of the materials is independently stretched under tension and treated in a manner dependent upon the particular end use for the laminated composite. For example, the plastic material may be irradiated in conventional processes to increase its strength or to improve its printability. In preferred embodiments, the plastic is printed with various graphics and provided with a metalized background to enhance the package appearance. The paper as well may undergo treatment such as being electrostatically charged to aid in the bonding process. Either the film material or the paper material or both are treated with suitable adhesive to provide a bond between the paper and the film. To complete the laminating process, the paper and film materials are pressed together between opposed rollers to produce a smooth, flat composite. Various heating or cooling processes may also be required to ensure proper adhesion of the surfaces, depending upon the type of film, paper, and adhesive agent which is being used in the process. The end product of the process is a laminated composite which may be fed directly to a die cutter or to other machines for further processing. The composite may also be taken up directly on a separate spool for storage and later processing.

Use of the film paper composite provides many advantages over conventional packaging material but also creates some unique problems. In order to be cost effective, the plastic material used is generally quite thin—on the order of 0.25-to-2.0 mils. Plastic films of such thicknesses tend to stretch or shrink during the lamination process as a result of variations in temperature and the varying inertial forces exerted on the film as it is unrolled and processed prior to bonding with the paper. Such stretching and shrinking may cause warping or buckling in the laminated composite as the film returns to a steady-state condition. Similarly, a printed image may be repeated on the film for later lamination in registry with predetermined lengths of paper material. In such cases, the printed image length must be held within close tolerances in order to permit proper registry with other processing activities such as automated cutting in a later process step.

Thus, it can be seen that a need exists for a paper-film laminating device which is capable of controlling the amount of stretching distortion in the plastic film material prior to lamination.

Apparatus for controlling the amount of longitudinal stretch in a web of plastic film being laminated to a web of paper board are disclosed in U.S. patent application Ser. No. 441,276 filed Nov. 12, 1982, now U.S. Pat. No. 4,496,417 issued Jan. 29, 1985, for CONTROL STRETCH LAMINATING DEVICE of Joseph Robert Haake, Tracy Jay Fowler, and James Wendell Jensen and U.S. patent application Ser. No. 624,480 filed June 22, 1984, now U.S. Pat. No. 4,572,752 issued Feb. 25, 1986, for CONTROL STRETCH LAMINATING DEVICE of James Wendell Jensen and Joseph Robert Haake, both of which are hereby incorporated by reference for all that is contained therein.

It has been found that in some applications it is necessary to accurately control the lateral as well as the longitudinal deformation of a moving film web. Lateral deformation control is especially important when the amount of longitudinal deformation of the film web is relatively large, since longitudinal stretching tends to cause the film web to shrink in its lateral dimension at a rate approximately predictable by Poisson's Ratio for the particular film web material being used.

It would thus be desirable to provide an apparatus capable of controlling lateral as well as longitudinal material in a moving film web.

SUMMARY OF THE INVENTION

The present invention comprises a laminating device and method for applying extensible plastic film material to paper material in a manner which monitors and controls the amount of stretch in the plastic material in both the longitudinal and the lateral directions.

The film material is drawn from a film spool by a drawing nip. In one embodiment of the invention, the drawing nip is formed by two pairs of driven belts. Each pair of belts is constructed and arranged to form a continuous, longitudinally extending nip for engaging one longitudinal edge of the film web. The belt pairs are positioned laterally opposite each other; thus, a portion of the film web passing through the drawing nip formed by these belts has both longitudinally extending edges thereof engaged simultaneously. Longitudinal stretch control is provided by changing the speed of the drawing nip (formed by the two opposite belt nips) with respect to the speed of a laminating nip positioned downstream of the drawing nip. For example, by setting the surface speed of the drawing nip at a speed below the surface speed of the laminating nip, the film web portion positioned between the drawing nip and the laminating nip is stretched a predetermined amount which is dependent upon the difference in surface speed between the drawing nip and the laminating nip.

In this embodiment, lateral stretch may be provided to the film web by deflecting one or both pairs of belts with respect to the longitudinal direction of the film web. For example, one belt pair may be set in a fixed longitudinal orientation; and the second belt pair may be pivoted about an axis coincidental with the point where the film web enters the second belt pair, the pivot axis being perpendicular to the plane of the film web. Thus, the film web may be stretched laterally by an amount equal to the amount of outward deflection at the downstream end of the second belt pair.

In another embodiment of the invention, a separate drawing nip is used to control each of the two stretching functions. For example, a first drawing nip may be provided by a pair of opposed pinch rollers; and a second drawing nip may be formed between the first drawing nip and a laminating nip by two opposite pairs of belt nips as described above. The lateral stretch may then be provided as described above by deflection of one or both belt pairs from a longitudinal orientation with respect to the film web. However, in this embodiment, the surface speed of the drawing nip formed by the two belt pairs is controlled to match the surface speed at the laminating nip. Longitudinal stretch control is provided by varying the surface speed of the first drawing nip formed by the pinch rollers with respect to the surface speed of the second drawing nip formed by the two belt pairs.

Of course, longitudinal stretch control may be provided by controlling the speed of any two adjacent nips with respect to each other; and, thus, speed controlled nips other than the laminating nip or the lateral stretch control nip might also be used for this purpose.

The laminating nip is generally formed by a power-driven main roll and a compression roll positioned in touching or near touching contact therewith. The paper and film are drawn by the laminating rolls while being compressed between them.

As the laminated composite leaves the laminating rolls, monitoring means such as one or more photoelectric assemblies can be provided to detect the passage of preprinted marks on the film. This information is supplied to a data-processing unit which detects any variance between the design (ideal) dimensions and the actually measured dimensions of the film web. The information from the photoelectric assemblies is processed by the data-processing unit in a manner which provides an output command signal to a driving means for the longitudinal stretch-control drawing nip to automatically adjust the surface component of rotational speed of the drawing nip with respect to the surface component of rotational speed of the laminating nip, or a second drawing nip, in order to provide a proper amount of longitudinal stretch to the film. Photoelectric signals related to the lateral dimensions of the film cause the data processing unit to provide control commands to the lateral stretch control nip to deflect one or both of the belt pairs to provide the desired lateral stretch to the film web. Information may be displayed in operator readable form to allow the operator to input certain time response commands relating to the system operation.

The drawing nip(s) and laminating nip may be driven by separate drive units such as individual electric motors which are "slaved together," i.e., phase-locked together by appropriate control circuitry. In another embodiment, a single main drive unit is used for all nips; and a direct-current correction motor (trim motor) and differential drive system are provided for varying the speed of the longitudinal stretch-controling drawing nip with respect to the speed component provided by the main drive unit.

It is among the objects of the present invention to provide a laminating device for forming a film paper composite wherein the lateral and longitudinal dimensions of the film material are monitored and controlled.

It is a further object of the invention to provide a film paper laminating device wherein the film dimensions are monitored by a photoelectric-sensing system.

It is a further object of the invention to provide a film-paper-laminating device utilizing one or more drawing nips in addition to a laminating nip to control the lateral and longitudinal dimensions of a plastic film web prior to lamination.

It is a further object of the invention to provide a film paper laminating device which utilizes a data-processing means as a component of the control system.

BRIEF DESCRIPTION OF THE DRAWING

Various illustrative embodiments of the invention are shown in the accompanying drawing in which:

FIG. 7 is a plan view of one embodiment of a film web lateral stretch control assembly;

FIG. 8 is a plan view of a second embodiment of a film web lateral stretch control assembly;

FIG. 9 is a partially exploded perspective view of a portion of the lateral stretch control assembly of FIG. 7;

DETAILED DESCRIPTION OF THE INVENTION

In general, the laminating device 10 comprises structure and controls for continuously laminating a continuous, relatively extensible film web 12 to a continuous, relatively nonextensible paper web 16 to form a continuous web of laminated composite 22 while continuously monitoring and adjusting both the longitudinal and the lateral dimensions of the film web.

The Laminator

Figure 1:
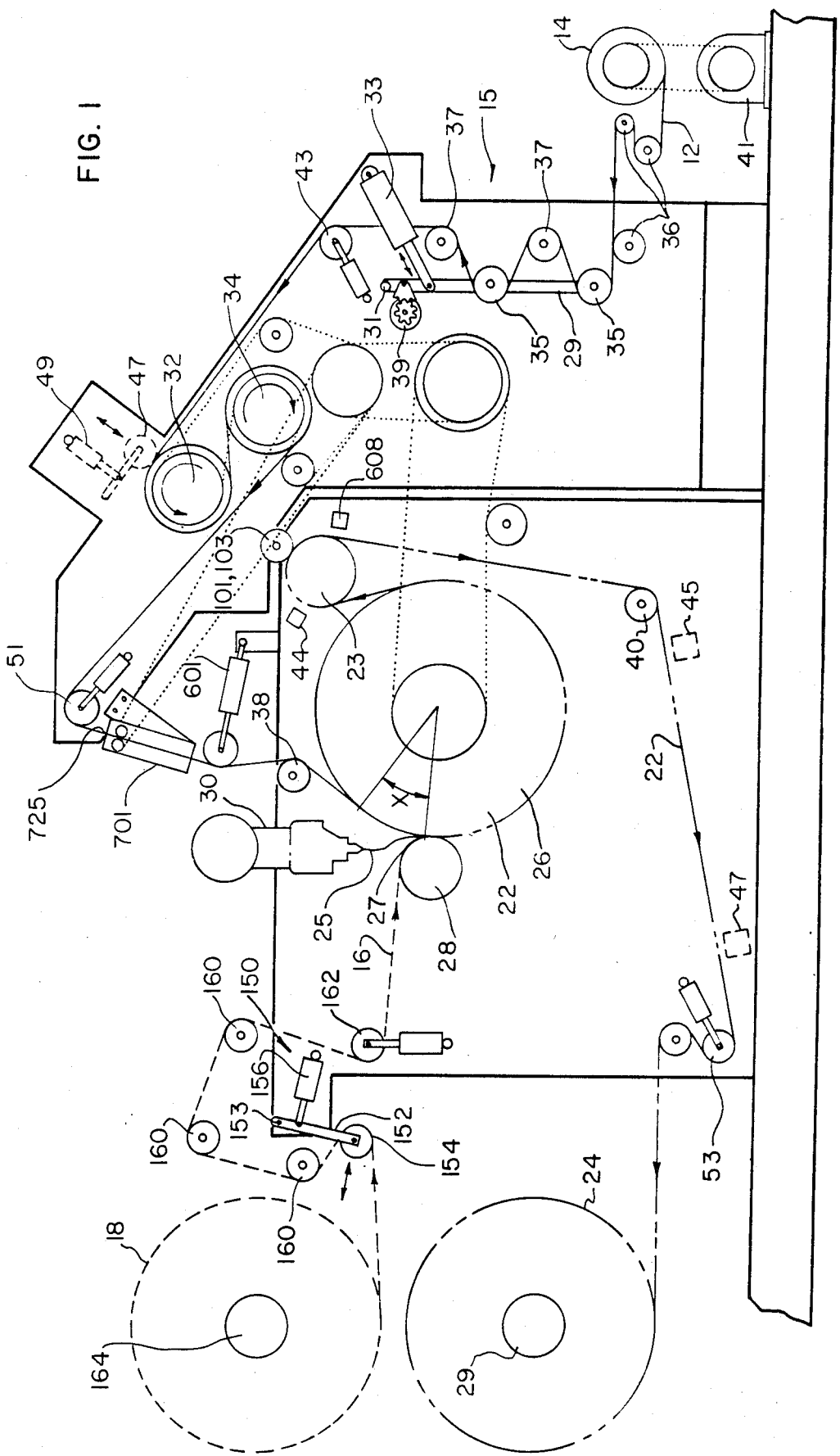
FIG. 1 is a schematic side elevation view showing the operation of a laminating device of a first embodiment.

As illustrated schematically by FIG. 1, the laminating device of the present invention comprises a film supply means such as film spool 14 for supplying a web of extensible plastic film material 12 to be laminated with a web of paper material 16 provided from a paper supply means such as a paper spool 18. A composite collection means such as a composite take up spool 24 is provided for collecting the composite film paper material after lamination. The film upon leaving the film spool 14 may pass through a film unwind dancer assembly 15 which may comprise a dancer arm 29 pivotally mounted at 31 to the machine frame. The dancer arm 29 is also pivotally attached to a pneumatic cylinder unit 33 having a preset internal pressure which is adjustable to accommodate different film web tensions which may be encountered in the use of different types of films or films of different thicknesses or widths. A pair of longitudinally spaced apart, dancer idler rolls 35 is mounted on dancer arm 29; a second pair of idler rolls is mounted at the machine frame in a longitudinally and transversely spaced relationship with the dancer rolls 35. The film web 12 is wrapped back and forth between the two pairs of rolls 35, 37 as shown in FIG. 1. Changes in the film web tension as a result of film speed fluctuation produced either upstream or downstream of the dancer are rapidly dampened out by the pivotal movement of the dancer arm 29 in response to the film speed differential. The constant pressure pneumatic cylinder co-acts with the dancer arm to maintain the film web at a present tension associated with the pneumatic cylinder pressure. A potentiometer unit 39 is actuated by rotational movement of the dancer and generates a control signal which is used to control a film spool motor 41 and a tachometer generator 42 FIG. 3 to either increase or decrease the rate at which film web 12 is unwound from the spool. The film web is drawn from the spool 14 by a first drawing nip means such as S-wrap draw rolls 32, 34 as discussed in further detail below. Thus, the dancer assembly provides a means for correcting and maintaining the tension of the film web at a constant tension value in a first film web tension zone between the film spool 14 and the draw rolls 32, 34.

A film web tension monitor such as an idler roll and load cell transducer assembly 43 monitors the tension in the film web 12 in the first tension zone and generates a tension monitoring control signal in response thereto which is input to a computer means 100 for control purposes as explained in further detail hereinafter. The film 12 may pass over a number of cylindrical idler rolls 36 which may be used to straighten and flatten the film 12 as it leaves the spool 14 and which also function to properly align the film material 12 with a first drawing nip means such as S-wrap rolls 32, 34. The first drawing nip means provides the motive force for drawing the film 12 from the film supply means and also cooperates with a second drawing nip means such as assembly 701 in controlling the longitudinal stretch in the film material as described in further detail below. Assembly 701 may provide a drawing nip by utilizing two laterally opposite belt pairs which engage opposite longitudinally extending edges of the film web 12 over a length of several inches. Assembly 701 is described in detail below with reference to FIGS. 7 to 9. The first drawing-nip means may comprise various draw roll configurations such as pinch rolls, also referred to as nip rolls, and other types of draw rolls. In the embodiment illustrated in FIGS. 1 to 4, the first drawing nip means comprise S-wrap rolls 32, 34. (In an alternate embodiment illustrated in phantom lines in FIG. 1, an idler pinch roll 47 having roll contacting force applied thereto by a pneumatic cylinder unit 49 may be used to augment the drawing action of rolls 32, 34 or, in another embodiment, may be substituted for roll 34.) The two equal-radius cylindrical rolls 32, 34 are positioned in parallel axial alignment and rotate in opposite directions at the same speed. The surface of the rolls 32, 34 must be sufficiently smooth to avoid damaging the plastic film web 12 and yet must provide sufficient frictional contact with the film web 12 to prevent slipping between the film and roll surfaces. Thus, the roll surface may be rubber or any number of other appropriate surfaces. The film web is wrapped in an S-shaped configuration over and around the upstream roll 32, then over and around the downstream roll 34 as illustrated in FIG. 1. This so-called "S-wrap" configuration enhances the frictional contact between the film web 12 and rolls 32, 34 providing a nonslipping "nip-effect" relationship wherein the rate of film advance upon leaving the rolls 32, 34 is equal to the tangential speed component at the surface of the rolls 32, 34. After leaving the first drawing nip means, the film web 12 passes over a second tension monitoring means 51 and thereafter passes into a second drawing nip means which, in the preferred embodiment of FIG. 1, also functions as a lateral stretch control means as described in further detail hereinafter. In the embodiment of FIG. 1, a laminating nip means forms a third drawing nip means. The laminating nip means may comprise a laminating nip 27 formed by laminating rolls 26, 28. The film web positioned between the first film drawing nip means and the second film drawing nip means defines a second film tension zone. The film web positioned between the second drawing nip means and the laminating nip means defines a third tension zone. A third tension monitoring means 601 may be provided to monitor the tension in the third tension zone.

In the preferred embodiment of FIG. 1, one or more idler rolls 38 may be used to position the film web 12 at a proper entry angle into the laminating nip 27. The film web 12 and paper web 16 are treated with an adhesive material such as, for example, a melted polymer plastic 25 (such as low-density polyethelene having a melt index of approximately 8 and supplied at a temperature above 615° F. and preferably 620° F. to 630° F.) which is supplied by an adhesive supply source 30 which causes permanent bonding of the paper web 16 and plastic-film web 12 as it passes through the laminating nip 27. The laminating rolls 26, 28 may comprise a main roll 26 which may have a diameter of 24 inches and which may contain cooling (or heating) elements to aid in the production of the adhesive bond between the paper and film. The main roll 26 is driven by a main drive means such as main drive motor 50 illustrated in FIG. 3 and discussed in further detail below. Compression roll 28 may also be driven by the same drive motor 50 or by a conventional "tendency" drive unit (not shown) which overcomes any frictional resistance between the webs and rolls to prevent composite distortion or may alternatively be driven solely by rolling contact with the main roll 26. Compression roll 26, in one embodiment, is also a chill roll and has a rubber outer surface to prevent web slippage which is cooled by a radially, inwardly positioned, roll-cooling structure of a type well known in the art.

The laminating nip 27 formed by laminating rolls 26, 28 draws the film web 12 and paper web 16 therethrough without slippage and simultaneously compresses it to form laminated composite 22. In applications where hot adhesive is applied to the film and paper web at the laminating nip 27, it has been found that the amount of arcuate coverage of the main chill roll 26 by the film web 12 prior to entering the nip may be critical. If the film web enters the laminating nip 27 with very little rolling contact with roll 26, then tension variations in the film web in the third tension zone may cause discontinuous film stretch in the area near the laminating nip which would result in scrap and adversely affect the stretch-control function of the machine. On the other hand, if the arcuate amount of film coverage of roll 26 prior to entry of the film into nip 26 is too great, it has been found that air is drawn into the interface between film web 12 and the roller 26 surface causing discontinuities or "bubbles" to form in the web prior to entering nip 27 which affect the quality of the composite 22 which is formed at the nip 27. When low-density polyethelene film having a melt index of approximately 2 is used with a 24-inch diameter chill roll 26 and where adhesive at a temperature of between 615° F. and 650° F. is applied to the laminating nip, it has been found that an angle of arcuate coverage "x" of between 35° F. and 65° F. is critical to operation of the laminating device 10.

Again, it should be noted that nonslipping contact between the moving surface of the laminating-nip means and the film web 12 is essential to the operation of the invention. In the preferred embodiment, this nonslipping contact is ensured by the relatively large surface area of the main roll 26 over which the film is wrapped as well as the compressive force exerted by the compression roll 28 at the laminating nip 27. As with the S-wrap rolls 32, 34, the surfaces of the compression roll 28 and main roll 26 must be sufficiently smooth to avoid damaging the film web 12 and paper web 16 and may comprise polished steel in the case of roll 26 and smooth rubber in the case of roll 28.

Nonslipping frictional contact is also provided between the film web and the nip forming surfaces of the second drawing nip means formed by assembly 701 as discussed in further detail below. In the embodiment of FIG. 1, the surface velocity of the second drawing nip means is maintained equal to the surface velocity of the laminating nip means. Thus, the film web tension therebetween, i.e., in the third tension zone, remains substantially constant. It may be seen that the rate of film advance at the point the film leaves the S-wrap rolls 32, 34 and the rate of film advance at the entrance point 725 of the second nip means are directly proportional to the surface velocity of the first drawing nip means and the surface velocity of the second drawing nip means, respectively. By changing the surface velocity of the S-wrap rolls 32, 34 with respect to the surface velocity of assembly 701, a speed differential is created in the film web between the point 40 where the film leaves the S-wrap rolls 32, 34 and the point 725 where it enters the second drawing nip, i.e., in the second film tension zone. By increasing the rotational speed of the S-wrap rolls 32, 34 with respect to the second drawing-nip means so that the tangential velocity component at the surface of the S-wrap rolls 32, 34 exceeds the tangential velocity component at the surface of the second drawing nip means, the film web therebetween is caused to relax in the longitudinal direction. By decreasing the relative speed of the first drawing nip means provided by S-wrap rolls 32, 34 with respect to the second drawing-nip means, the film is caused to stretch in the longitudinal direction. The amount of longitudinal stretch or relaxation provided to the film in the second tension zone is thus dependent on the difference between the surface speeds of the first and second drawing nip means.

The paper web 16 is drawn from a paper supply spool 18 by the laminating rollers 26, 28. In the embodiment illustrated in FIG. 1, the paper web is passed through a paperweb dancer assembly 150 comprising a dancer arm 152 pivotally attached at 153 to a fixed-frame structure and having a single dancer idler roll 154 mounted thereon for receiving the paper web 16 thereabout. The dancer arm 152 is pinned to a constant pressure pneumatic cylinder 156 which functions in the same manner as film dancer cylinder 33 to provide a constant web tension. Upon leaving the dancer assembly, the paper web passes over a series of idler rollers 160 and thereafter around a paper tension monitor 162 which provides a paper web tension indicating signal to the computer 100, or, alternatively, directly to control circuitry for controlling a drag brake 164 to vary the speed of the paper unwind to cooperate with the dancer assembly 150 to maintain the paper web at a constant tension value. Alternatively, the paper dancer assembly 150 could be provided with a potentiometer of the same type used with the film dancer assembly 15 to drag brake 164 to adjust the paper spool angular velocity.

Upon leaving the laminating nip 27, composite 22 may pass over another series of idler rolls 40 and a composite tension monitor 53 and is thereafter received by a collection means such as composite take up roll 24 driven by a take up motor 29 which changes speed in response to a signal generated by tension monitor 53 to maintain a preset tension in the composite web 22. Alternatively, the composite 22 may be further processed as by cutting and folding devices (not shown) to form a final or more completed product.

Length-Monitoring Means

Figure 4:
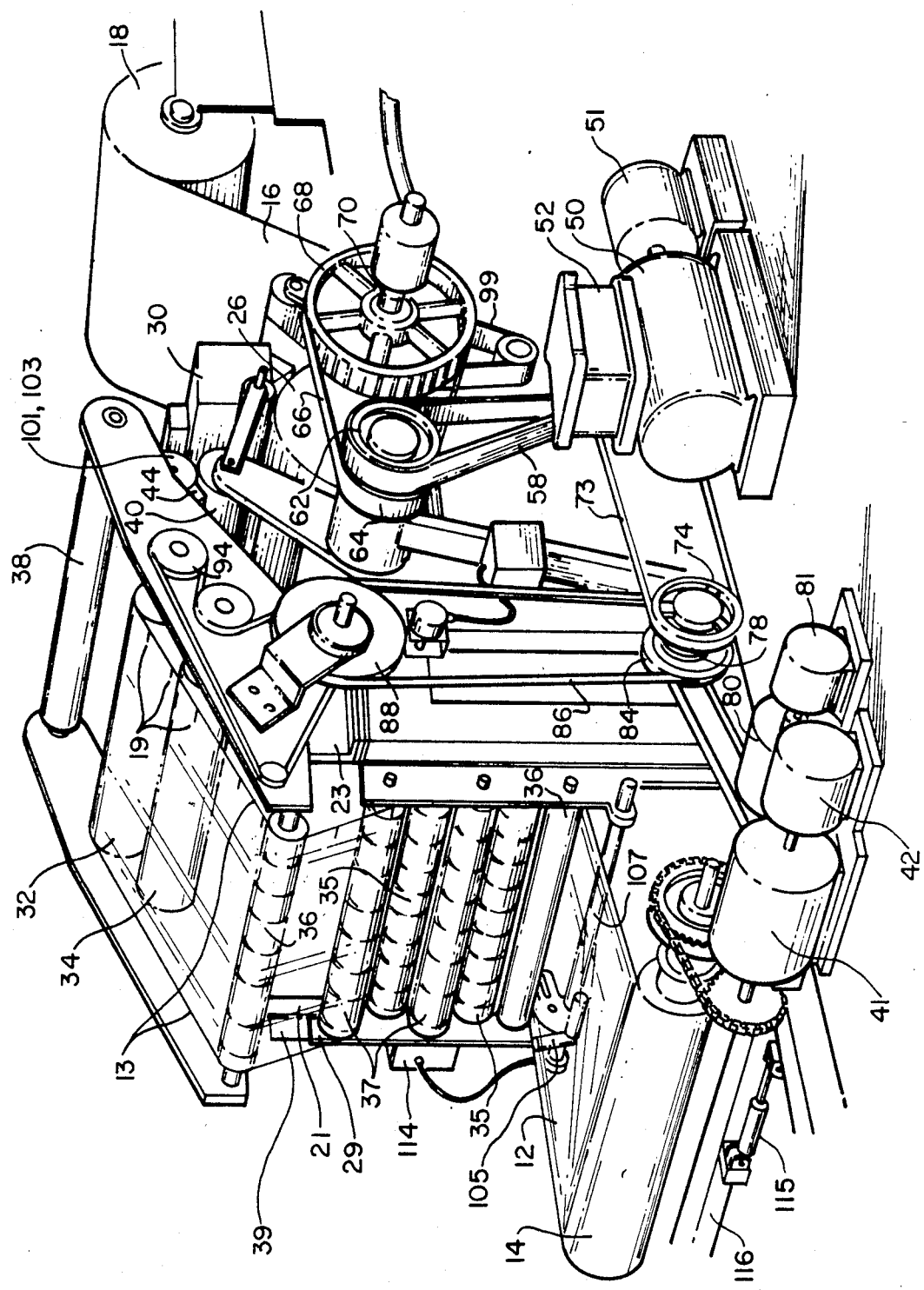
FIG. 4 is a perspective view of a laminating device of the type shown schematically in FIG. 1.

The relative longitudinal stretch in selected portions of the film web 12 subsequent to its lamination with the paper web 16 is measured by a length-monitoring means. In one embodiment, the film web 12 is provided with photoelectrically readable preprinted marks 19 positioned at equally spaced points near one edge of the film 12 as shown by FIG. 4. The distance between these marks 19 will be referred to hereinafter as the "repeat length." As previously mentioned, the laminating device is designed to longitudinally stretch or relax the film 12 in order to laminate predetermined length portions of the film 12 to the paper backing material 16. The distance between the marks 19 in an "ideal" or "design" condition will be referred to as the "design repeat length." However, during operation of the laminating device 10, the film web 12 will stretch and relax; and, thus, the distance between marks may deviate slightly from the design repeat length until the system corrects itself as discussed hereinafter. The actual distance measured between marks 19 by the length monitoring means described hereinafter will be referred to as the "actual repeat length."

The length monitoring means provides data to a data processing means from which the amount of stretch or relaxation in the film may be computed. The data processing means provides a control signal to a first drawing nip means speed control means responsive to the length monitoring means data to selectively vary the speed of the first drawing nip means with respect to the second drawing means for imparting a predetermined amount of stretch or relaxation to the film as it passes between the first and second drawing nip means. The second drawing nip means is speed controlled to match its surface speed to that of the laminating nip means so as to provide a constant tension in the third tension zone between the second drawing nip means and the laminating nip means.

In the illustrative embodiments, the monitoring means comprise photoelectric-sensing means such as photoelectric unit 44 positioned at some point near the path of the composite web 22 downstream from laminating nip 27 for detecting the preprinted, spaced-apart marks 19 on the film 12 edge. The photoelectric unit operates in a conventional manner by sending out an electronic pulse signal in response to a disturbance in a beam of light (not shown) provided by the unit. In this use of the photoelectric unit with the present invention, the disturbance in the light beam is produced by the passage therethrough of a preprinted mark 19. The photoelectric unit 44 might be any of a number of commercially available, high speed units such as MEI Services Inc.'s Scan-A-Matic Model PLM-2000.

Although the drawing shows that marks 19 are positioned in an "unobstructed field" (i.e. no other marks are imposed between any pair of marks 19 in the longitudinal path which is monitored by photoelectric unit 44), it is also within the scope of the present invention to provide marks 19 in an obstructed field and to provide a suitable photoelectric unit and control circuitry for "recognizing" and selecting only the predetermined marks 19 for the measuring and control functions which are further described herein. Method and apparatus for providing the monitoring means with such a mark recognition capability in an obstructed field are disclosed in applicant's co-pending U.S. patent application, filed on even date herewith and entitled OBSTRUCTED FIELD INDICIA SENSING DEVICE, U.S. patent application Ser. No. 667,914, which is hereby incorporated by reference for all that is disclosed therein.

Figure 2:
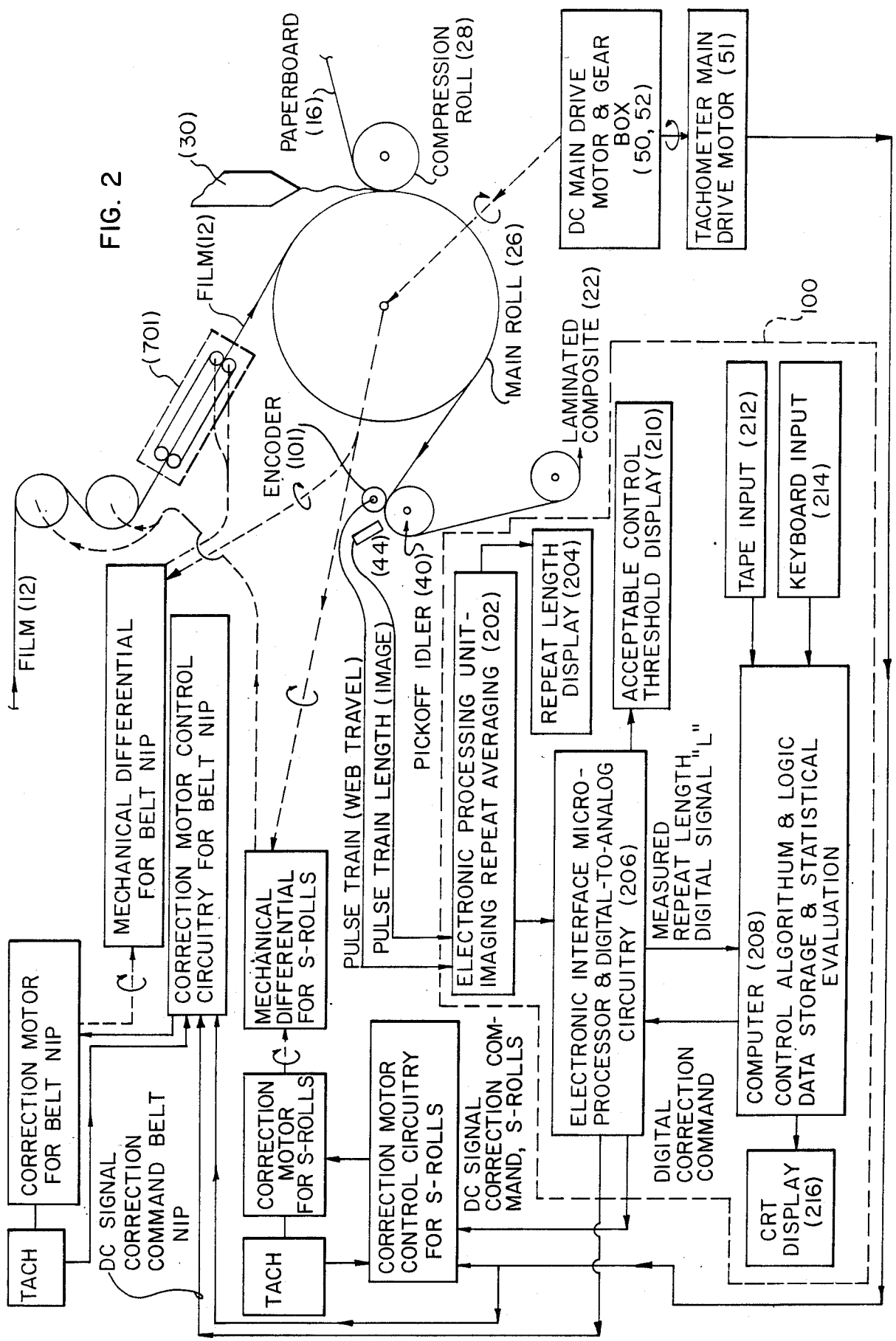
FIG. 2 is a schematic drawing showing the longitudinal stretch monitoring and control functions of the laminating device of the type shown in FIG. 1.

In a preferred embodiment as illustrated schematically by FIG. 2, the photoelectric unit 44 provides a single electronic pulse signal to the data processing means, which may be an electronic data processing unit 100, each time a printed mark is detected. As further illustrated by FIG. 2, a continuous electronic pulse train is also provided as input to the data processing unit 100 by an electronic encoder unit 101. The electronic encoder may be rotatably connected as by a drive belt 99 (FIG. 4) or other conventional means to one of the drive shafts in the main roll 26 drive system or, as illustrated by FIGS. 1 and 4, may comprise a roller portion 103 of a predetermined diameter which contacts and is rotated by the composite web 22. The electronic encoder 101 emits a fixed number of pulses per revolution of the roller portion 103 or the associated drive system shaft typically on the order of 3,000-to-6,000 p.p.r. Thus, the pulse train receives its master speed reference from the main rolldrive system providing a time base for computer operations described below. The rotary pulser may be of a commercially available type such as the Baldwin 5V278 Optical Incremental Encoder.

The data-processing unit 100 is programmed by a conventional circuitry well known in the art to count the number of pulses input from the rotary pulser 101 between consecutive pulses detected by photoelectric unit 44. In slightly different language, the signal from the photoelectric unit initializes a "count window" which is loaded with digital data. The data is loaded into memory at the detection of the next mark, and a new count window is simultaneously initialized for the next data loading.

The digital data from each count window is processed to determine the actual repeat length of the film passing the photoelectric unit 44, and the result is compared by means of conventional comparator circuitry well known in the art to a value representing the design repeat length which is stored in memory. Electronic correction commands are generated based on the deviation between the actual and the design repeat lengths and provided as analog input to correction motor control circuitry 82.

Operator input from a conventional input terminal 102 of a type well known in the art provides processing information such as the design repeat length and the amount of deviation of the actual repeat length from the design repeat length required to initiate correction commands as well as the number of count window repeats required to initiate correction commands.

Longitudinal Stretch Control

Figure 3:
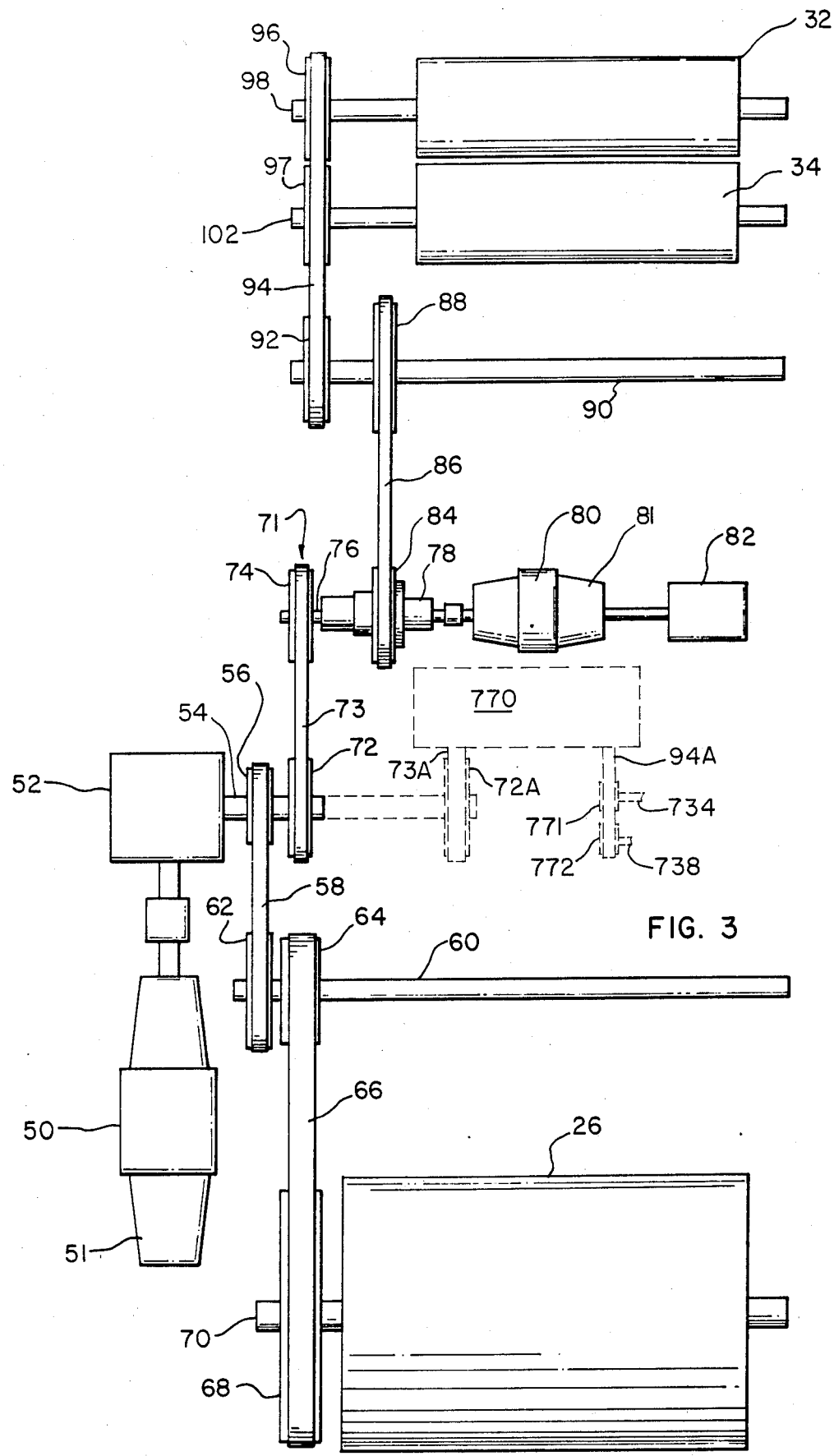
FIG. 3 is a schematic plan view showing major elements of a drive train of a laminating device of the type shown in FIGS. 1 and 1A.

The electronic correction commands provided to the control circuitry 82 actuate a direct-current "trim" or correction motor 80 mechanically linked to a phase-drive unit, FIG. 3. A conventional motor-speed-monitoring means such as a tachometer generator 81 is operably connected to the correction motor drive shaft and outputs a tach signal which is also provided to the correction motor control circuitry 82.

The mechanical output of the phase drive unit 71 is drivingly linked to the S-wrap rolls 32, 34 as discussed in further detail hereinafter; and the rotational speed of the rolls 32, 34 is thus controlled with respect to the main roll 26 rotational speed by mechanical input from the correction motor 80. Since the second drawing nip means is maintained at the same surface speed as the main roll 26, the speed of the S-wrap rolls is also controlled relative to the speed of the second drawing nip means. (The method for maintaining the speed of the second drawing nip means equal to the laminating nip means is discussed in detail hereinafter with reference to FIG. 2.)

Thus, by calculating the actual repeat length of the laminated composite 22 with information supplied by the encoder 101 and photoelectric unit 44 and comparing the result to the design repeat length, the processing unit 100 controls the speed of the S-wrap rolls 32, 34 through appropriate control circuitry and a phase-drive system to control the longitudinal stretch or relaxation of the film 12.

As indicated by phantom lines in FIG. 1, the method of monitoring the film repeat length may be varied slightly by using two photoelectric assemblies 45, 47 positioned at a spaced apart distance equal to the design repeat length of the film. In this embodiment, a count window is initialized by a mark-detection pulse from one photoelectric detector and terminated by a mark detection pulse from the other photoelectric detector. If the actual repeat length is equal to the design repeat length, consecutive, spaced-apart preprinted marks 19 pass the detectors 45, 47 simultaneously leaving no time gap between the pulse signals generated thereby. Thus, no pulse train digital data enter—the count window. However, any deviation of the actual repeat length from the design repeat length will cause the marks 19 to pass the detectors 45, 47 at different times producing a time differential between the pulse signals produced by the detectors 45, 47. The time differential between signals allows pulse train data to be loaded into the count window, the number of pulse train pulses in the window indicating the amount of error in length. Thus, in this embodiment, no operator input to the processor 100 is required to indicate the design repeat length; but the photoelectric devices 45, 47 must be physically positioned at a distance equal to the design repeat length or some multiple thereof.

The processing unit 100 may also be provided with a display 110 for displaying various information such as actual repeat length, repeat length error, time response data, etc., depending upon the programming software used.

The mechanical linkage of the laminating device is illustrated in FIG. 3. A main drive means such as main drive motor 50 with tachometer generator unit 51 is operably connected to a main gear box 52 which, in turn, drives main drive shaft 54. Main drive shaft pulley 56 mounted on shaft 54 is connected by means of drive belt 58 to a secondary drive shaft pulley 62 coaxially mounted on secondary drive shaft 60 with pulley 64. Pulley 64 is operably connected to main roll pulley 68 by another belt 66 whereby the main roll 26 is rotated about main roll drive shaft 70. S-wrap rolls 32, 34 are mechanically linked to phase drive unit 71 and main drive motor 50 as by main drive-shaft parasite pulley 72 operably connected by belt 73 to phase drive pulley 74, in turn, mounted on phase-drive shaft 76. Phase drive shaft 76 is operably connected by conventional means well known in the art to a differential unit 78 such as, for example, a Conac 25 Differential Unit having a phase drive correction pulley 84. Phase drive correction pulley 84 is operably connected by means of a drive belt 86 to conversion pulley 88 mounted on conversion drive shaft 90 upon which S-wrap connector pulley 92 is coaxially mounted. S-wrap roll belt 94 is operably connected to upper S-wrap roll pulley 96 and lower S-wrap roll pulley 97 in an S-wrap configuration (FIG. 4) whereby first and second S-wrap shafts 98, 102 and, consequently, S-wrap rolls 32, 34 are rotated in opposite directions at the same speed.

Mechanical input to differential unit 78 is provided by correction motor 80 for the purpose of increasing or decreasing the rotation speed of phase drive correction pulley 84. The correction motor rotational input is added to or subtracted from the speed of shaft 76 by an internal differential gearing mechanism (not shown) of a type well known in the mechanical arts. Correction motor 80 is actuated and controlled by correction motor control circuitry unit 82 which, in turn, receives commands from processing unit 100 as discussed in further detail herein.

As illustrated in phantom line in FIG. 3, a drive linkage beginning with pulley 72A mounted on shaft 54 and ending with belt 94A wrapped in an S-wrap configuration about pulleys 771 and 772 may be provided to drive shafts 734, 738 of assembly 701. See also FIGS. 7 to 9. The linkage components, designated schematically as 770, between 72A and 94A, may be identical to those linkage components between 72 and 92 discussed above. This linkage assembly may be used to maintain the surface speed of the second—drawing nip means equal to the speed of the laminating nip means.

The control components of the longitudinal stretch control system will now be described in further detail with reference to FIG. 2.

The longitudinal stretch control system components of the embodiment of FIG. 1 are illustrated schematically in FIG. 2. The web speed indicating pulse train from encoder 101 and the film mark sensing pulse train from photoelectric unit 44 are supplied to an electronic processing unit 202 which computes and averages repeat lengths from information provided by the two pulse trains. The repeat length may be displayed on a conventional CRT unit or LED digital display at 204. The averaged repeat length values from unit 202 are also provided to electronic microprocessor and digital-to-analog circuitry 206 which transmits digital data corresponding to the measured repeat length to a microcomputer 208. The electronic interface circuitry also provides a signal to an LED display which provides an acceptable control threshold display 210. The microcomputer 208 which contains the control algorithm and logic and which provides data storage and statistical evaluation of the system receives its operating instructions by conventional input devices such as tape input unit 212 and keyboard input unit 214. A CRT display 216 for displaying various system information and for presenting information requests to the operator is provided. The computer 208 processes the digital repeat length data from interface circuitry 206 and outputs a digital-correction command to the interface circuitry which converts the digital command to an analog voltage command which is provided to the correction motor control circuitry 82. A main drive reference speed signal is provided from the main drive motor tachometer unit 51 to the S-wrap correction motor contro circuitry 82, and a feedback reference speed signal from the S-wrap correction motor 80 is also provided to the S-wrap correction motor control circuitry. The S-wrap correction motor control circuitry processes these reference signals and correction signal and provides an appropriate signal to the S-wrap correction motor to increase, decrease or maintain its present speed as may be required. As explained above, the correction motor mechanical output to mechanical differential unit 71 adjusts the speed of the S-wrap rolls 32, 34 to stretch or relax the film web 12 passing through the second tension zone.

As further illustrated by FIG. 2, the surface speed of the second drawing nip means provided by assembly 701 is speed controlled to match the surface speed of the laminating nip means. In the control scheme illustrated in FIG. 2, the second laminating nip means is provided with a mechanical linkage identical to that of the first drawing nip means as discussed with reference to FIG. 3. A main drive reference speed signal is provided from the main drive motor tachometer unit 51 to the belt nip correction motor control circuitry. A feedback reference speed signal from the belt nip correction motor tach is also provided to the belt nip correction motor control circuitry. The belt nip correction motor control circuitry processes these reference signals and correction signal and provides an appropriate signal to the belt nip correction motor to increase, decrease or maintain its present speed as required to match the speed of the laminating nip 27.

Figure 1A:
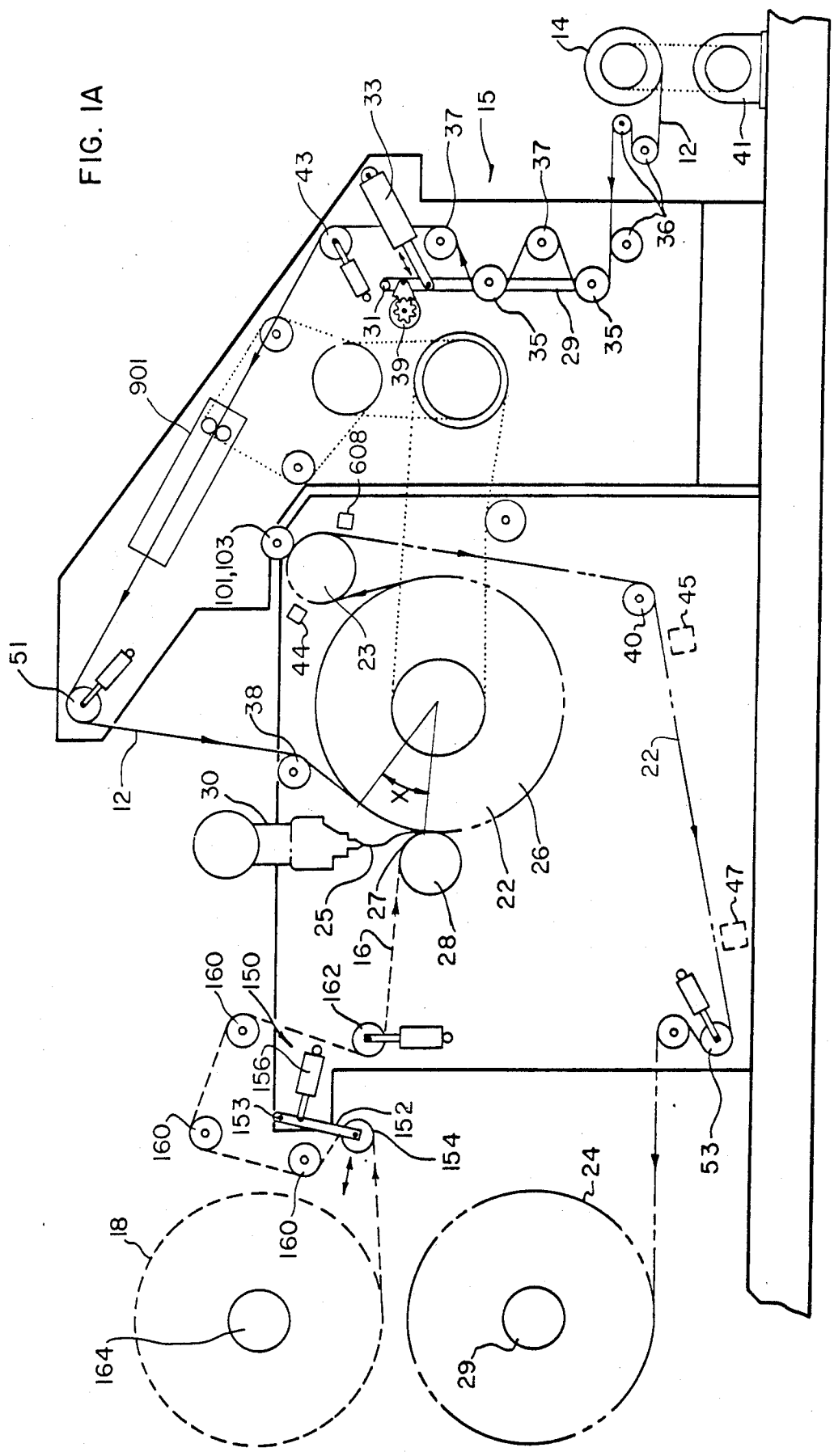
FIG. 1A is a schematic side elevation view showing the operation of a laminating device of a second embodiment.

Another embodiment of the invention is illustrated in FIG. 1A. In this embodiment, the drawing nip provided by S-wrap rolls 32, 34 is replaced by a first drawing nip formed by an assembly 901 having two belt pairs positioned to engage opposite, longitudinally extending edges of the film web 12. The assembly 901 may be identical to the assemblies illustrated in FIGS. 7 to 9 and discussed in further detail hereinafter. In this embodiment, the first drawing nip is again speed controlled relative to a second drawing nip to control the longitudinal stretch in the film web 12. However, in this embodiment, the laminating nip 27 comprises the second drawing nip means rather than an intermediate drawing nip. Except for the replacement of the S-wrap nip and the nip of assembly 701 of FIG. 1 with a single drawing nip formed by assembly 901, FIG. 1A is the same as FIG. 1. A first, relatively constant tension zone is thus provided between film unwind spool 14 and the film entrance to assembly 901. A second variable tension zone is provided between the exit of assembly 901 and the laminating nip 27. The film web may be stretched or shrunk in the second tension zone by decreasing or increasing the surface speed of a first drawing nip means formed by assembly 901 with respect to the surface speed of a second drawing nip means formed by laminating rolls 26 and 28.

Figure 2A:
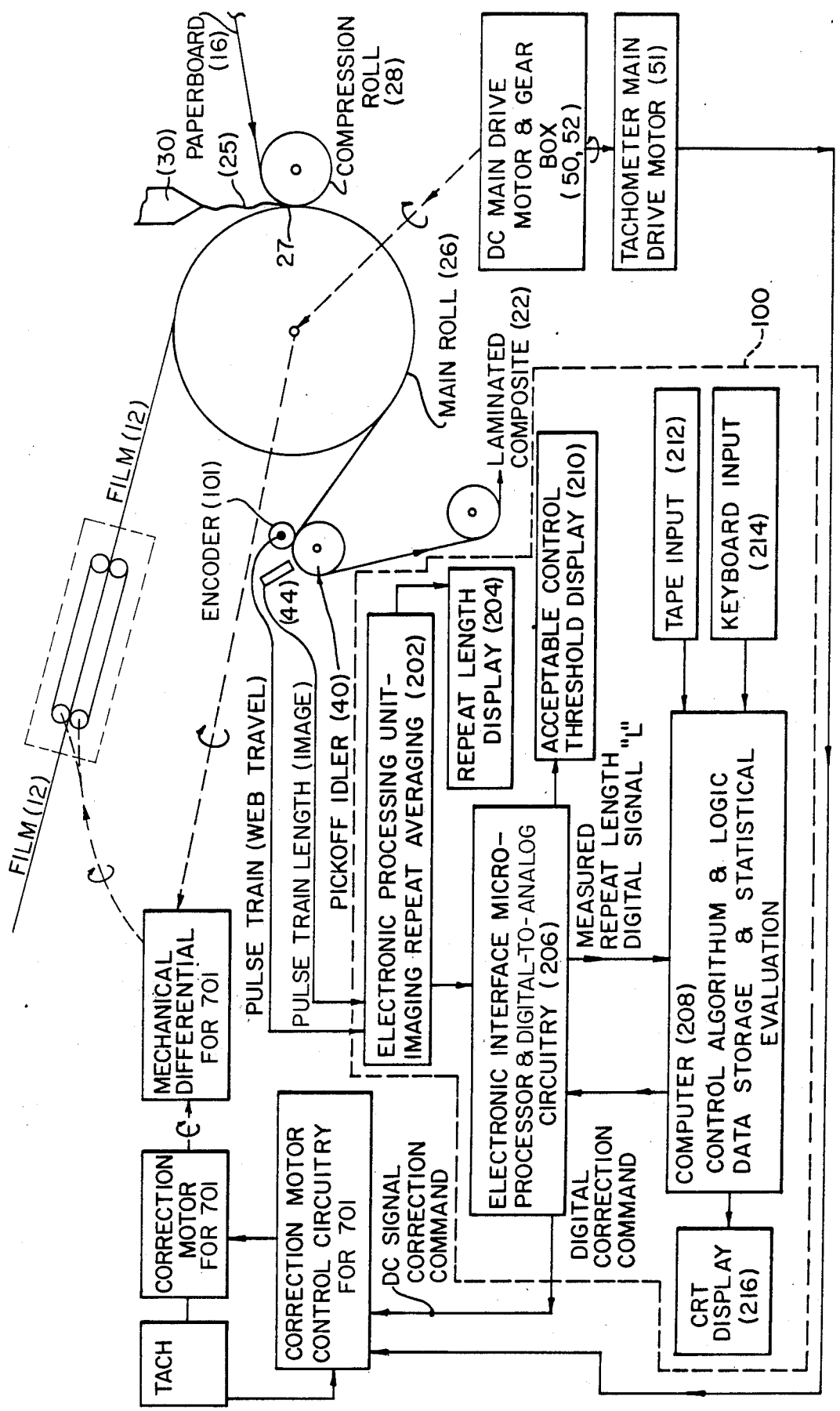
FIG. 2A is a schematic drawing showing the longitudinal stretch monitoring and control functions of the laminating device of the type shown in FIG. 1A.

The method and apparatus for controlling the nip surface speed of assembly 901 with respect to the laminating nip surface speed may be essentially identical to the apparatus and method used for controlling the speed of the S-wrap rolls described above with reference to FIGS. 1 and 2. Thus, a mechanical linkage identical to that described with reference to FIG. 3 may be employed to drive the nip of —assembly 901. As illustrated by FIG. 2A, this mechanical linkage may be incorporated into a control system in the same manner as described for controlling the speed of the S-wrap rolls in FIG. 2.

In general illustrated by FIG. 7 and 8, the lateral stretch control apparatus of the present invention comprises film web lateral stretch control means such as a lateral stretch assembly 701, 901 which receives the film web 12 at a position just upstream of the laminating nip 27. In the embodiment shown in FIG. 1 stretch assembly 701 is used in cooperation with S-wrap rolls 32, 34 to provide longitudinal stretch control in addition to its primary function of lateral stretch control. In the embodiment of FIG. 1A assembly 901 is used in cooperation with the laminating nip 27 to provide longitudinal stretch control as well as its primary function of lateral stretch control. The following discussion deals exclusively with the lateral stretch control function of the assembly represented as 701 in FIG. 1 and 901 in FIG. 1A and shown in detail in FIGS. 7-9. For brevity the single reference numeral 701 will be employed throughout the remainder of the application when referring to this assembly.

The lateral stretch control apparatus also comprises a film width monitoring means which may include a photoelectric mark detection assembly 606, 608 positioned downstream of the laminating nip 27. In the embodiment illustrated in FIG. 1, a portion of the film width monitoring means, photoelectric unit 608, is shown positioned proximate take off roll 23. The film width monitoring means may also include a web speed sensing means such as electronic encoder unit 101, discussed above, for generating a machine speed based signal, which is processed with the signal from the mark detection assembly 606, 608 to determine film width as discussed in further detail below.

Figure 5:
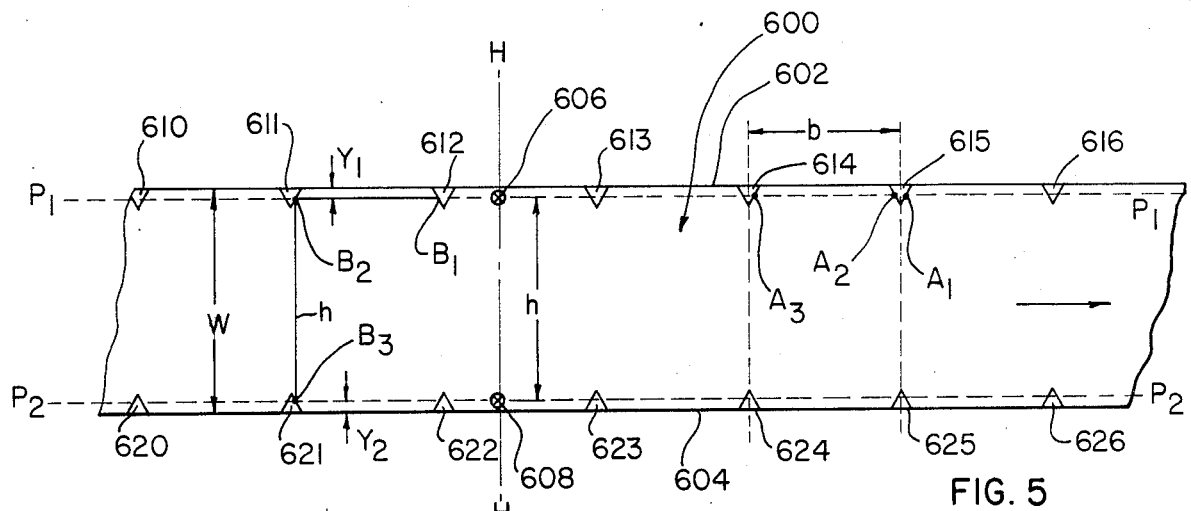
FIG. 5 is a plan view showing a film web with printed indicia thereon and photoelectric indicia sensors.
Figure 6:
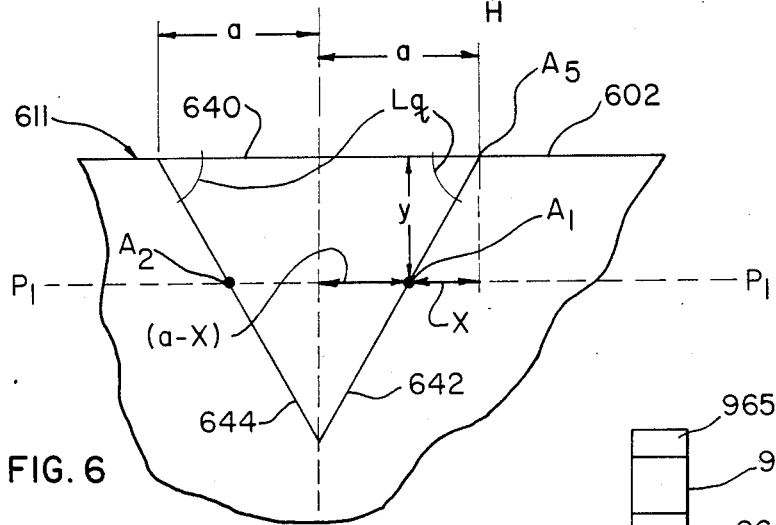
FIG. 6 is a detail view of one of the indicia of FIG. 5.

The method of monitoring the width of the film web 12 will now be described with reference to FIGS. 5 and 6. As illustrated in FIG. 5, a portion of the film web 600 having lateral edges 602, 604 passes immediately below a pair of laterally spaced apart photoelectric units 606, 608 which comprise a photoelectric means for sensing the passage of spaced apart indicia means on the film web. In the embodiment illustrated in FIG. 5, the spaced apart indicia means comprise a first series of substantially equally spaced apart marks 610-616, etc. and a second series of substantially equally spaced apart marks 620-626, etc. positioned in mirror image relationship to the first series of marks. In one preferred embodiment which is the best mode presently contemplated, the marks comprise a triangular configuration having a base portion 640, FIG. 6, coincident with an associated edge portion 602, 604 of the film web and having a leading edge 642 positioned downstream (with reference to the direction of film travel in FIG. 5) of a trailing edge 644 which forms the third side of the triangular mark. In the embodiment illustrated in FIGS. 2 and 3 each triangle comprises an identical isoceles triangle, however, other triangular, and/or geometric configurations having a leading edge and a spaced apart trailing edge, at least one of which is nonparallel and nonperpendicular to the web edges 602, 604, may be used with equal effectiveness as will become obvious to one of ordinary skill in the art after reading this specification.

The photoelectric units 606, 608 are used to detect the points in time at which both a leading edge portion and a trailing edge portion of each mark pass immediately below it (i.e., on path $P_1$ or $P_2$, respectively). By comparing this set of signals to a web speed based signal, it is possible to determine the distance between a point $A_1$ on the leading edge of a mark, e.g., 615, and a point $A_2$ on the trailing edge of that mark which falls within the scan path, e.g., $P_1$ of the associated photoelectric unit, e.g. 606. Alternately, the measurement could be taken between a point $B_1$ on the trailing edge of one mark, e.g. 612, and a point $B_2$ on the leading edge $B_2$ of the next succeeding mark 611. From either set of information it is possible, as described in further detail below, to calculate the relative position of a photoelectric unit, e.g. 606 from an associated lateral edge, e.g. 602 of the film Web 600. When the respective distance of each photoelectric unit 606, 608 from an associated lateral edge of the film web 602, 604 is known, the width "w" of the film web may be calculated by adding the preset lateral distance "h" between the two photoelectric units 606, 608 to the respective lateral distance "y" of each photoelectric unit from its associated edge of the film web, i.e. the distance between path $P_1$ or $P_2$ and the associated film edge 602, 604.

Having thus described the operation of the film width monitoring means in general, the operation will now be described in detail. The construction and arrangement of the invention is such that the film web at portion 600 passes below the two photoelectric units 606, 608 in substantially perpendicular relationship to a straight line HH extending between the two photoelectric units. For purposes of reference, the unknown width of the film web is indicated as "w" and the known lateral distance (measured perpendicular to the path of the web) between the two photoelectric units 606, 608 is indicated as "h". The paths along the film web portion 600 positioned immediately below a photoelectric units 606, 608 is indicated in FIG. 5 as $P_1P_1$ and $P_2P_2$, respectively. The distance between any two identical points on two succeeding marks, e.g. 614, 615 (e.g., the distance between mark centerlines) is indicated as "b". It may be seen that the value "b" may be obtained by measuring the distance between two succeeding points, e.g. $A_1$ and $A_3$ lying on leading edges of two succeeding marks, e.g. 614 and 615 and falling within an associated scan path, e.g. $P_1P_1$. (Thus this width monitoring apparatus may also be used to measure longitudinal spacing between preprinted marks and might be used instead of the longitudinal stretch monitoring assembly discussed above when both longitudinal and lateral dimensions are to be monitored.) It may also be seen that the lateral distance between two points, e.g. $B_2$, $B_3$ on laterally opposite pairs of marks which are coincident with the two paths $P_1P_1$, $P_2P_2$ is equal to the lateral distance between the two photoelectric units 606, 608. Referring now to FIG. 6, the acute angle which the leading edge 642 and trailing edge 644 make with the base of the triangle 640 is indicated as "q". Half the length of the base 640 (a known value) is indicated as "a". The longitudinal distance between a point $A_5$ at the forward most portion of the base and a point $A_1$ along path $P_1P_1$ and coincident with the leading edge 642 is indicated as "x". The longitudinal distance between point $A_1$ and the longitudinal center of the triangle is therefore equal to (a-x). The lateral distance between point $A_1$ and the base 640 of the triangle is indicated as "y".

The distance between $A_1$ and $A_2$, which may be seen to equal 2(a -x), may be calculated by the central processing unit 100 by comparing the time base signals generated by photoelectric units 606 with the web speed base signal generated by the encoder unit 101. Let this calculated distance value equal "k". Thus 2(a-x)=k. Solving this expression for the value x, we have x=(2a -k)/2. As a matter of elementary trigonometry, the values "y" and "x" are related by the expression tan (q)=y/x or y=x tan (q). Thus y=(2a −k) tan (q)/2. Since the values of "a", "k", and "q" are known, the value of "y" can be calculated by the computer. Although the above discussion relates to the calculation of the distance "y" from the path $P_1P_1$ from web edge 611, exactly the same method may be used for calculating the distance of path $P_2P_2$ from lateral edge 604. The value "w" is thus equal to $h+y_1+y_2$ where $y_1$ is the distance of unit 606 from web edge 602 and $y_2$ is the distance of unit 608 from edge 604.

It should be noted that a small amount of lateral shifting of the film web in the direction of one of the photoelectric units 606 or 608 will not effect the accuracy of this calculation so long as the lateral shifting is not sufficiently large to take one of the series of film marks entirely out of an associated path $P_1P_1$ or $P_2P_2$.

The film web lateral stretch control means will now be described with reference to FIGS. 7-10. As illustrated by FIGS. 7 and 8, the film web lateral stretch control means may comprise a pair of longitudinally extending guide means 710, 712 which frictionally engage opposite portions of the moving film web 12 proximate the film web lateral edges 702, 704 along a length of the film web designated as 700. In the embodiment illustrated in FIG. 7 longitudinally extending guide means 712 is pivotable about axis DD positioned perpendicular to the plane of the film web and guide 710 is fixed. In the embodiment illustrated in FIG. 8, both guide 710 and guide 712 are pivotable about axes EE and DD, respectively, both axes being positioned perpendicular to the plane of the film web portion 700.

The construction of guide means 712, which may be identical to that of guide means 714, is illustrated in further detail in FIG. 9. It may be seen that guide means 712 comprises a pair of oppositely positioned endless belts 720, 722, each belt being mounted on a pair of rollers 724, 726, and 728, 730, respectively. The two belts 720, 722 rotate in opposite directions and are positioned in close parallel relationship to form a nip area 723 extending from a film web entrance position 725, where the film web is initially engaged, to a film web exit position 727, where the film web is disengaged from the belt nip. The two belts 720, 722 may be driven by conventional driving apparatus well known in the art, such as separate electric motor unit 731 or alternately by mechanical linkage to the main drive motor as described above with reference to FIG. 3. The portion of the film web positioned between the two belts is engaged by the belt nip 723 in secure, nonslipping contact. It may be seen from FIG. 9 that the belt drive rolls, 724, 726, 728, 730 are mounted on associated parallel shafts 732, 734, 736, 738 which are in turn mounted on a bracket assembly 740 comprising a longitudinally extending connection portion 742 and two transversely extending branch portions 744, 746. The shafts 732, 734, 736, 738 may extend through the associated branch portions 744, 746 in journalled relationship therewith to be conventionally connected such as by gears (not shown) to associated drive means such as motor 731. Bracket assembly 740 has a pivot shaft 748 fixedly attached thereto at a position thereon immediately below the film web nip entry portion 725. The shaft 748 enables bracket 740 to be pivoted about axis DD. Shaft 748 may be pivoted as by a geared linkage 750, 752 connecting it to a pivotal movement means such as electric control motor 756 having an associated angular displacement sensor 757. In the embodiment illustrated in FIGS. 8 and 9 a second geared linkage 752, 760 is provided to a shaft 762 oriented coaxially with pivot axis EE for pivoting guide means 710 which is operably attached thereto in the same manner as shaft 748 and guide means 712.

Referring again to FIG. 9, it will be seen that a belt sheath 741 is provided which has opposite rows (only one shown) of roller bearings 743 for urging the two belts 720, 722 into tight web engaging contact. The roller bearing are conventionally journalled to the longitudinally extending, U-shaped sheath 741. The sheath may be supported on bracket 740 as by welded support members 745, 747.

Figure 10:
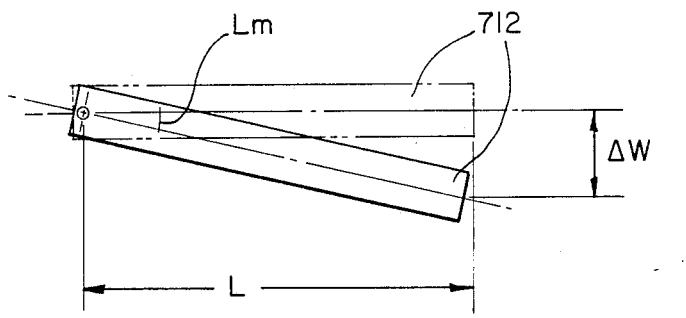
FIG. 10 is a detail plan view of one guide means of a lateral stretch control assembly of the type illustrated in FIGS. 7 and 8.

Referring to FIG. 10, it may be seen that in order to laterally stretch the film, one (or both) of the guide means 710, 712 may be deflected such that the downstream end thereof is positioned outwardly of a parallel alignment with the film web direction of travel. In the arrangement of FIG. 7, the entire width increase "w" would be provided by pivotal movement of guide means 712 alone. The angle of deflection "m" of the guide means 712 from a straight ahead position being related to the increase in width "w" by the relationship, tan m=w/L, where "L" is the length from entry nip portion 725 to exit nip 727. Of course, when both longitudinal guide means 710, 712 are deflected, as in the arrangement of FIG. 5, then the amount of deflection of each is equal to one half of the total amount of deflection "w" necessary to provide the desired amount of stretch to the film web.

Figure 11:
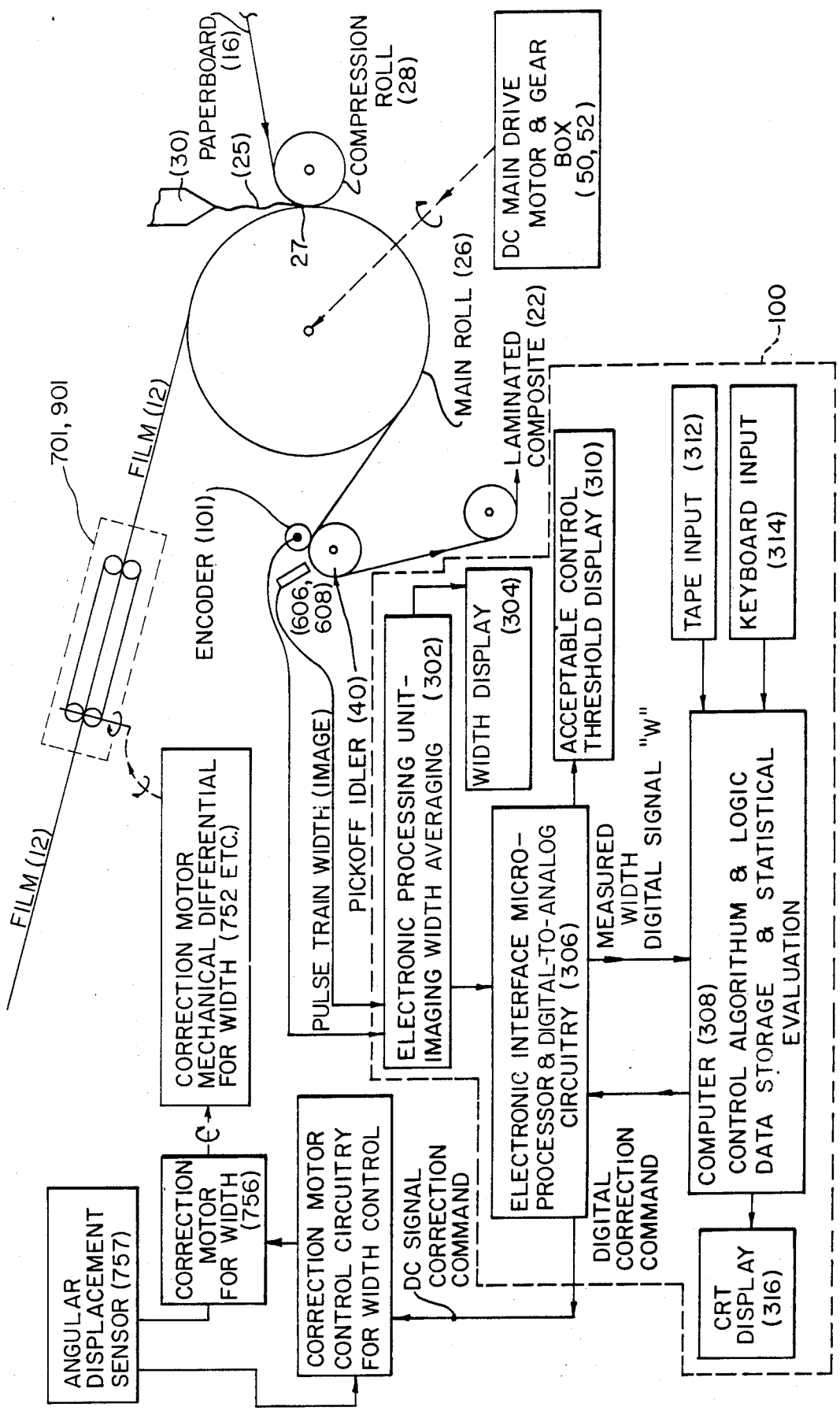
FIG. 11 is a schematic drawing showing the lateral-stretch monitoring and control functions of a laminating device of the type shown in FIGS. 1 or 1A.

The monitoring and control system for lateral stretch control of the film web 12 is illustrated schematically in FIG. 11. An electric pulse signal corresponding to sensed leading or trailing indicia edges is provided by photoelectric sensors 606, 608 and a web speed dependent electronic pulse signal is provided by encoder unit 101. These two signals are processed by an electronic processing unit 302 to determine the width of the film web at the position of the photoelectric sensors 606, 608. This measured width value may be displayed in operator readable form by display unit 310. A digital signal indicative of the measured width is provided from processing unit 302 to electronic interface and digital analog circuitry unit 306 and control algorithm computer 308 which compares the measured width indicating signal to a predetermined design width value and in turn provides an analogue correction command signal dependent upon the amount of error in the width, to width correction motor 756 control circuitry. The correction motor control circuitry also receives a feedback signal from the correction motor angular displacement sensor 757. Based on these two signals the correction motor control circuitry actuates the correction motor which in turn drives mechanical linkage 752 etc. to pivot one guide means 712 (in the embodiment of FIG. 7) or both guide means 710, 712 (in the embodiment of FIG. 8) to provide the necessary angular alignment of the guide means to stretch the film web to achieve the predetermined design width at the measuring station. The control algorithm will, of course, be dependent upon physical properties of the film web such as thickness, strength, elastic return characteristics, etc. and will also be dependent upon the distance of the lateral stretch control unit 701, 901 from the laminating nip and the base film web tension and operating speed. Such properties are well understood and a control algorithm taking such physical properties into account may be provided by one of ordinary skill in the art without undue experimentation.

Figure 12:
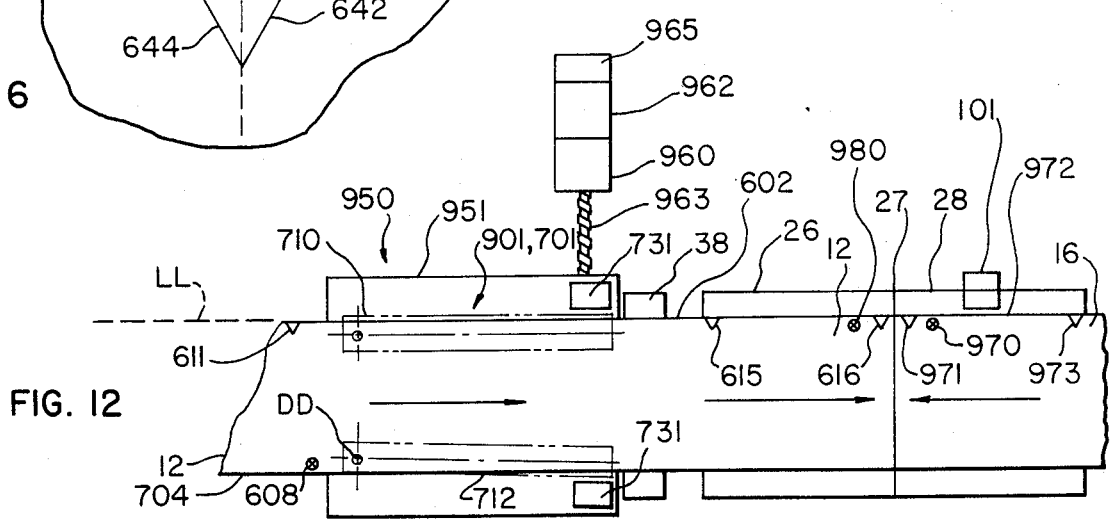
FIG. 12 is a plan view of a web lateral alignment control assembly.

As illustrated schematically in FIG. 12, in one preferred embodiment of the invention, one lateral edge 602 of the film web 12 is maintained at a predetermined lateral position relative the machine frame (i.e. in coaxial alignment with longitudinal machine axis LL) by lateral movement of a film lateral alignment assembly 950 which may include guide means 710, 712, which are mounted on a laterally moveable platform 951.

In this embodiment, the lateral position of the film web is monitored by photoelectric unit 980 which may be of identical construction to units 606, 608. The photoelectric unit is not attached to the lateral alignment assembly and is positioned near laminating nip 27 at a fixed location relative the machine frame and other laterally non-displaceable components of the laminator.

The photoelectric unit 980 "reads" the marks 610-616 etc. on the film web in the same manner as described above with reference to FIGS. 5 and 6 by sensing the leading edge 642 and the trailing edge 644 of a mark. The distance between the leading edge and trailing edge of the mark is then calculated as described above by counting the number of machine speed based electronic pulses from encoder 101 occuring between the two edge sensing pulses generated by the photoelectric unit 980. If the lateral edge 602 of the film web remains in a fixed lateral position relative the laterally stationary components of the laminator (and thus the photoelectric unit 980 as well) then each mark 610-616 will be read at the same relative lateral position with respect to the photoelectric unit 980 and the distance value measured between the leading and trailing edge of each mark will remain constant. However, if the film web lateral edge 602 shifts laterally outwardly or inwardly, then the measured value between leading and trailing edge will decrease or increase by an amount which is directly proportional to the amount of lateral displacement from the preselected lateral position, e.g. on axis LL. The amount of lateral error may thus be calculated by processing unit 100 and the lateral alignment assembly 950 may be moved laterally as a unit to correct the lateral alignment error independently of the above described lateral stretch control operation. The means for moving the assembly 950 laterally may be a conventional DC motor 960 equiped with appropriate feed back circuitry 962 for sensing displacement of platform 951 and providing a feed back signal to the correction motor control circuitry, see FIG. 13. Motor 960 is controlled by its control circuitry 965 which is responsive to control commands from central processing unit 100 in response to the calculated lateral error in the film web. The DC motor 960 may be mechanically linked to a worm gear 963 or other conventional mechanical displacement apparatus for causing lateral displacement of alignment assembly 950 to the corrected position in alignment with axis LL.

In a modified version of this lateral alignment scheme, shown in FIG. 12, one lateral film web edge 602 is maintained in alignment with a lateral edge of the paper web 16 or a longitudinal axis thereof rather than with a fixed longitudinal machine axis LL. In this embodiment, another photoelectric sensor 970, which may be of identical construction to sensor 980, is mounted proximate one lateral edge 972 of the paper web near laminating nip 27. The lateral edge portion of the paper web is provided with a series of equally spaced, wedge shaped or equivalent marks 971, 973, etc. which may be identical to marks 610-616, etc. on the film web. The relative lateral position of the paper web may thus be determined by data processing means 100 from information provided by photoelectric sensor 970 and encoder 981 in the same manner as described above for the film web. Since the lateral position of both the paper web and the film web may be continuously monitoried in this manner, the lateral position of the film web may be shifted to place it in alignment with the film web by comparison of the position indicating signals for the two webs. In one embodiment for accomplishing this result, both webs are provided with identically shaped and identically positioned marks.

The film web and paper web are initially positioned in proper alignment. Next, the photoelectric sensors 980 and 970 are positioned above the respective webs such that both sensors 602, 970 provide identical mark leading edge to trailing edge distance readings. Thereafter, any deviation of the film web mark distance reading from the paper web mark distance reading will indicate an error in alignment. The error may be corrected by shifting the film web: outwardly if its mark distance value is larger than the paper web mark distance value or inwardly if its mark distance value is smaller, until the mark distance values are again equal. The shifting assembly 950 and drive means 960 which are used may be the same as described above in regard to shifting with respect to a fixed longitudinal machine axis LL.

Figure 13:
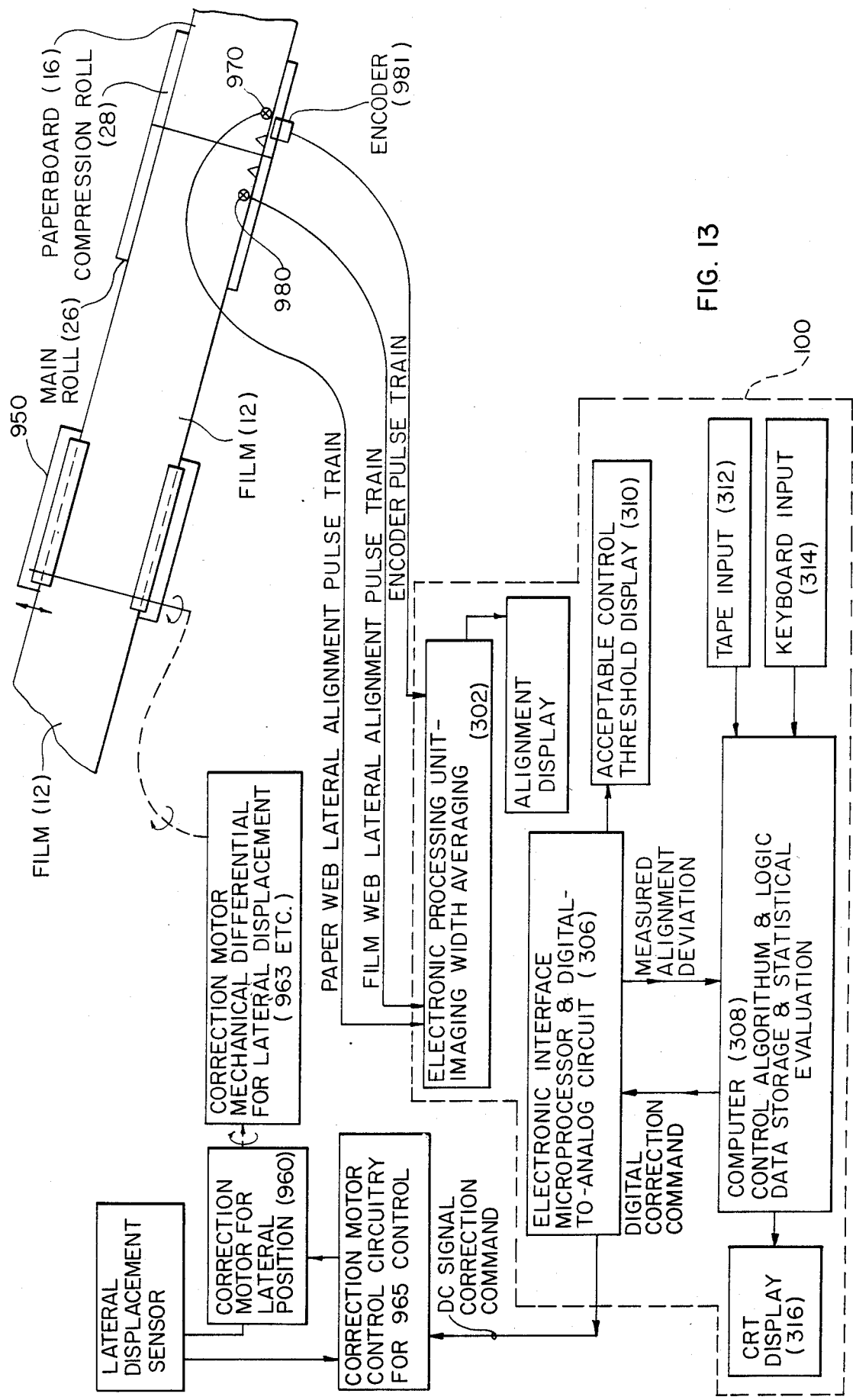
FIG. 13 is a schematic drawing showing the web lateral alignment monitoring and control functions of a laminating device of the type shown in FIGS. 1 or 1A.

The above described lateral alignment scheme of FIGS. 12 and 13 is preferably used in combination with a lateral stretch control scheme, of the type shown in FIG. 7, wherein stretch control is achieved by angular deflection of only one guide means 712 with the other guide means 710 maintaining a straight ahead alignment. The edge of the film web which is measured for lateral alignment purposes is the edge that is engaged by the non-deflecting guide means 710. Thus, both guide means 710, 712 are simultaneously shifted laterally by movement of platform 951 to provide proper lateral alignment of the film web edge 602. To achieve lateral stretch control, only one guide means 712 is angularly deflected.

It is contemplated that the inventive concepts herein described may be variously otherwise embodied and it is intended that the appended claims be construed to include alternative embodiments of the invention except insofar as limited by the prior art.

What is claimed is:

1. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:
   (a) paper supply unwind roll means for providing a continuous supply of paper to be laminated;
   (b) film supply unwind roll means for providing a continuous supply of film to be laminated;
   (c) laminating nip means, for drawingly engaging said film web and said paper web in parallel touching contact whereby each said web is moved at the same web speed, and for bondingly compressing said film web to said paper web to form a laminated composite;
   (d) film web lateral stretch control means positioned along said film web between said film supply unwind roll means and said laminating nip means for frictionally engaging said film web and for selectively varying the width of the portion of the film web passing therethrough from a first width at a position where the film web enters said lateral stretch control means to a second width at a position where the film web leaves said lateral stretch control means during continuous movement of the film web from said film unwind roll means through said laminating nip;
   (e) film width monitoring means for measuring the width of predetermined portions of said film web at a position downstream from said film web lateral stretch control means and for providing a monitor signal to a signal processing means;
   (f) signal processing means for comparing said monitor signal to a predetermined film width value and providing command signals responsive thereto to said film web lateral stretch control means for imparting a selected amount of lateral deformation to said film web whereby said film web is continuously extensibly adjusted to a predetermined width by said lateral stretch control means.

2. The invention of claim 1 wherein said film web lateral stretch control means comprises:
   first longitudinally extending guide means having an upstream end and downstream end means for frictionally engaging a first lateral edge of said moving film web along a predetermined length thereof;
   second longitudinally extending guide means for frictionally engaging a second lateral edge of said moving film web along a predetermined length thereof at a position laterally opposite said first longitudinally extending guide means;
   said second longitudinally extending guide means comprising an upstream end and a downstream end and being pivotal at said upstream end about a second guide means pivotal axis positioned substantially perpendicular to the plane of said moving film web, whereby said second guide means is angularly displaceable relative said first guide means whereby said film web is stretchable from said first width at said upstream ends of said guide means to said second width at said downstream ends of said guide means by an amount proportionate to the amount of deflection of said second guide means from a parallel alignment with said first guide means.

3. The invention of claim 2 wherein said first guide means retains a fixed alignment relative said film web during operation of said film web lateral stretch control means whereby said lateral edge of said film web engaged by said first guide means retains a relatively straight line configuration from the entrance to the exit of said stretch control means.

4. The invention of claim 2 wherein said first guide means is angularly deflectably relative said second guide means by pivotal movement about a first guide means pivot axis positioned in substantially perpendicular alignment with the plane of said film web at said upstream end of said first guide means.

5. The invention of claim 4 wherein said first guide means and said second guide means are constructed and arranged whereby each said guide means pivots simultaneously about its respective pivot axis whereby the central longitudinal axis of said film web retains a straight line configuration from entrance to exit of said film web lateral stretch control means.

6. The invention of claim 2 said film web lateral stretch control means further comprising second guide means angular displacement means for pivoting said second guide means about said second guide means pivot axis in response to said command signal from said signal processing means.

7. The invention of claim 6 wherein said angular displacement means comprises an electrical motor.

8. The invention of claim 1 wherein said film width monitoring means comprises:
   spaced apart indicia means on said film web and
   indicia detection means for detecting the passage of said indicia means and generating a time based signal in response thereto; and
   film web speed sensing means for sensing the speed of said film web and generating a speed based signal in response thereto.

9. The invention of claim 8 wherein said indicia means comprises:
   a first series of longitudinally spaced apart marks printed along one longitudinally extending edge of said film web, and a second series of longitudinally spaced apart marks printed along the other longitudinally extending edge of said film web laterally opposite said first series of marks;
   each said mark comprising a two dimensional shape having at least one linear mark edge portion extending from an associated edge of said film web at a predetermined nonperpendicular angle therewith whereby a laterally outwardly positioned point on said linear mark edge portion is positioned in longitudinally spaced relationship on said film web from a laterally inwardly positioned point, the difference in longitudinal distance between said inwardly and outwardly positioned points being proportional to the lateral distance between said points.

10. The invention of claim 8 wherein each of said marks comprises an identical triangular configuration each said triangle comprising a leading edge and a trailing edge.

11. The invention of claim 9 wherein said indicia detection means comprises photoelectric means for sensing the leading edge and trailing edge of said marks.

12. The invention of claim 11 wherein said photoelectric means comprises:
a first photoelectric unit positioned proximate one lateral edge of said film web for detecting said first series of marks;
a second photoelectric unit positioned proximate said second edge of said film web for detecting said second series of marks; said first and second photoelectric units being positioned laterally opposite one another at a predetermined lateral distance.

13. The invention of claims 8 wherein said film web speed sensing means comprises electric encoder means operably lineked to a laiminating roll portion of said lamintaing nip means for generating a series of electrical pulses having a frequency proportional to the rotational speed of said laiminating roll.

14. A method of detecting the width of a moving web of material comprising the steps of:
(a) providing a first set of identical longitudinally spaced indicia having a leading edge and a trailing edge, on one longitudinally extending edge of the moving a web at predetermined distance therefrom and providing a second set of identical indicia on a second longitudinally extending edge of the web at a predetermined distance therefrom in mirror image relationship to the first set of indicia;
(b) at a first fixed moitoring point above the first side of the web, measuring the time between the passage of the leading edge and the passage of the trailing edge of a first indicia;
(c) substantially simultaneously with step (b), at a second fixed monitoring point above the second side of the web and laterally opposite the first monitoring point, measuring the time between the passage of the leading edge of a second indicia in mirror image relationship with said first indicia and the passage of the trailing edge of the second indicia;
(d) simultaneously with steps (b) and (c) measuring the velocity of the web;
(e) calculating the longitudinal distance between the detected portion of the leading edge and the detected portion of the trailing edge of said first indicia from the time value of step (b) and the velocity value of step (d);
(f) calculating the longitudinal distance between the detected portion of the leading edge and the detected portion of the trailing edge of said second indicia from the time value of step (c) and the velocity value of step (d);
(g) determining the lateral distance between the first monitoring point and the first longitudinally extending edge of the web from the calculated longitudinal distance of step (e) and the slopes of the edges of the first indicia;
(h) determining the lateral distance between the second monitoring point and the second side of the web from the calculated longitudinal distance of step (f) and the slopes of the edges of the second indicia;
(i) determining the width of the film web in the area between the two sets of marks by adding the lateral distance values of the two monitoring points from the respective sides of the web, determined by steps (g) and (h), to the lateral distance between the first and second monitoring points.

15. The method of claim 14 comprising the further steps of:
(j) comparing the measured width of the web to a preset width value; and
(k) deforming the web at a position upstream from said monitoring points to adjust the width of the web to said preset width value.

16. The invention of claim 15 wherein the step of deforming the web comprises the steps of:
(i) nippingly engaging a first side of the web along a predetermined length with a first guide nip;
(ii) nippingly engaging a second side of the web with a second guide nip along a length in mirror image relationship with the engaged portion of the first side;
(iii) angularly deflecting said first and second guide nips with respect to one another so as to provide a greater distance between downstream ends thereof than upstream ends thereof so as to laterally stretch the web a selected amount during movement of the web from the upstream ends to the downstream ends of said guides.

17. A method of laminating paper sheet material in roll form to plastic film sheet material in roll form by use of an adhesive material comprising the steps of:
mounting a roll of the paper sheet material on a first feed roll;
mounting a roll of the film sheet material on a second feed roll;
simultaneously, continuously unwinding the roll of paper sheet material and the roll of film sheet material to provide a length of paper sheet material and a length of film sheet material;
simultaneously continuously advancing the length of paper sheet material and the length of film sheet material to a laminating station comprising a main roll means and a compression roll means defining a nip area therebetween and an adhesive applying means located adjacent the nip area for laminating the film sheet material to the paper sheet material;
continuously applying adhesive material between the paper sheet material and the film material in the nip area;
applying pressure to the paper sheet material and the film sheet material and the adhesive material during passage through the nip area to form a fixed lamination;
passing the length of film sheet material past adjustable guide means located between the lamination station and the feed roll means and variably adjusting the guide means to laterally stretch the film material passing therethrough;
sampling the lateral distance between fixed indicia on the film web downstream of the adjustable guide means and generating a control signal representative of that distance; and
adjusting the guide means in accordance with the control signal so as to maintain the width of the film sheet material within a predetermined tolerance.

18. The method of claim 17 including the step, simultaneously with the step of applying pressure to the paper sheet material and the film sheet material during passage through the laminating area, of:
withdrawing heat from the paper sheet material and the film sheet material and the adhesive sheet material during passage through the nip area to form a fixed lamination.

19. The invention of claim 18 wherein the step of sampling the lateral distance between fixed indicia on the lamination comprises the steps of:
monitoring the speed of the lamination and generating a speed based control signal in response thereto;
monitoring the passage of selected portions of the fixed indicia on the lamination at a monitoring station downstream of the laminated station and generating a time-based control signal in response thereto;
calculating the longitudinal distance between the selected portions of the fixed indicia by comparing said time-based signal and said speed-based signal, and
calculating the lateral distance between the selected portions of the fixed indicia and associated portions of the web edge from the angular orientation of the fixed indicia and the calculated longitudinal distance between selected portions of the fixed indicia.

20. The invention of claim 19 wherein the method of continuously monitoring the speed of said lamination includes the step of continuously monitoring the rotational speed of a rotating portion of the apparatus.

21. The invention of claim 20 wherein the method of continuously monitoring the speed of said lamination includes the step of continuously monitoring the rotational speed of a rotating portion of the laminating nip.

22. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:
(a) paper supply unwind roll means for providing a continuous supply of paper to be laminated;
(b) film supply unwind roll means for providing a continuous supply of film to be laminated;
(c) laminating nip means, for drawingly engaging said film web and said paper web in parallel touching contact whereby each said web is moved at the same web speed, and for bondingly compressing said film web to said paper web to form a laminated composite;
(d) film web lateral stretch control means positioned along said film web between said film supply unwind roll means and said laminating nip means for frictionally engaging said film web and for selectively varying the width of the portion of the film web passing therethrough from a first width at a position where the film web enters said lateral stretch control means to a second width at a position where the film web leaves said lateral stretch control means during continuous movement of the film web from said film unwind roll means through said laminating nip;
(e) film width monitoring means for measuring the width of predetermined portions of said film web at a position downstream from said film web lateral stretch control means and for providing a monitor signal to a signal processing means;
(f) film web longitudinal stretch control means positioned along said film web between said film supply unwind roll means and said lamination nip means for frictionally engaging said film web and for selectively varying the length of the portion of said film positioned between said film web longitudinal stretch control means and a cooperating film web engaging nip positioned downstream of said film web longitudinal stretch control means;
(g) film length monitoring means for measuring the length of predetermined portions of said film web at a position downstream from said film web longitudinal stretch control means and for providing a length monitor signal to a signal processing means;
(h) signal processing means for comparing said monitor signal to a predetermined film width value and providing command signals responsive thereto to said film web lateral stretch control means for imparting a selected amount of lateral deformation to said film web whereby said film web is continuously extensibly adjusted to a predetermined width by said lateral stretch control means, and for comparing said monitor signal to a predetermined film length value and providing command signals responsive thereto to said film web longitudinal stretch control means for impacting a selected amount of longitudinal deformation to said film web whereby the longitudinal dimension of predetermined portions of said film web is continuously extensibly adjusted to a predetermined value.

23. The invention of claim 22 wherein said film web longitudinal stretch control means is positioned upstream of said film web lateral stretch control means and wherein said cooperating film web engaging nip positioned downstream of said film web longitudinal stretch control means comprises said lateral stretch control means.

24. The invention of claim 22 wherein said film web lateral stretch control means comprises:
first longitudinally extending guide means having an upstream end and a downstream end means for frictionally engaging a first lateral edge of said moving film web along a predetermined length thereof;
second longitudinally extending guide means for frictionally engaging a second lateral edge of said moving film web along a predetermined length thereof at a position laterally opposite said first longitudinally extending guide means;
said second longitudinally extending guide means comprising an upstream end and a downstream end and being pivotal at said upstream end about a second guide means pivotal axis positioned substantially perpendicular to the plane of said moving film web, whereby said second guide means is angularly displaceable relative said first guide means whereby said film web is stretchable from said first width at said upstream ends of said guide means to said second width at said downstream ends of said guide means by an amount proportionate to the amount of deflection of said second guide means from a parallel alignment with said first guide means.

25. The invention of claim 24 wherein said first guide means retains a fixed alignment relative said film web during operation of said film web lateral stretch control means whereby said lateral edge of said film web engaged by said first guide means retains a relatively straight line configuration from the entrance to the exit of said stretch control means.

26. The invention of claim 24 wherein said first guide means is angularly deflectably relative said second guide means by pivotal movement about a first guide means pivot axis positioned in substantially perpendicular alignment with the plane of said film web at said upstream end of said first guide means.

27. The invention of claim 26 wherein said first guide means and said second guide means are constructed and arranged whereby each said guide means pivots simultaneously about its respective pivot axis whereby the central longitudinal axis of said film web retains a straight line configuration from entrance to exit of said film web lateral stretch control means.

28. The invention of claim 24 said film web lateral stretch control means further comprising second guide means angular displacement means for pivoting said second guide means about said second guide means pivot axis in response to said command signal from said signal processing means.

29. The invention of claim 28 wherein said angular displacement means comprises an electrical motor.

30. The invention of claim 24 wherein said film width monitoring means comprises:
spaced apart indicia means on said film web and
indicia detection means for detecting the passage of said indicia means and generating a time based signal in response thereto; and
film web speed sensing means for sensing the speed of said film web and generating a speed based signal in response thereto.

31. The invention of claim 30 wherein said indicia means comprises:
a first series of longitudinally spaced apart marks printed along one longitudinally extending edge of said film web, and a second series of longitudinally spaced apart marks printed along the other longitudinally extending edge of said film web laterally opposite said first series of marks;
each said mark comprising a two dimensional shape having at least one linear mark edge portion extending from an associated edge of said film web at a predetermined nonperpendicular angle therewith whereby a laterally outwardly positioned point on said linear mark edge portion is positioned in longitudinally spaced relationship on said film web from a laterally inwardly positioned point, the difference in longitudinal distance between said inwardly and outwardly positioned points being proportional to the lateral distance between said points.

32. The invention of claim 30 wherein each of said marks comprises an identical triangular configuration each said triangle comprising a leading edge and a trailing edge.

33. The invention of claim 31 wherein said indicia detection means comprises photoelectric means for sensing the leading edge and trailing edge of said marks.

34. The invention of claim 33 wherein said photoelectric means comprises:
a first photoelectric unit positioned proximate one lateral edge of said film web for detecting said first series of marks;
a second photoelectric unit positioned proximate said second edge of said film web for detecting said second series of marks;
said first and second photoelectric units being positioned laterally opposite one another at a predetermined lateral distance.

35. The invention of claims 30 wherein said film web speed sensing means comprises electric encoder means operably linked to a laminating roll portion of said laminating nip means for generating a series of electrical pulses having a frequency proportional to the rotational speed of said laminating roll.

36. The invention as in any of claims 24–35 wherein said film web longitudinal stretch control means comprises said first and second longitudinally extending guide means;
and wherein said cooperating film web engaging nip positioned downstream of said film web longitudinal stretch control means comprises said laminating nip;
said first and second longitudinally extending guide means being speed controlled relative to said laminating nip means whereby a film web portion positioned between said longitudinally extending guide means and said laminating nip means is adjustably stretchable by variation of the speed of said longitudinally extending guide means relative to said laminating nip means.

37. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:
(a) paper supply unwind roll means for providing a continuous supply of paper to be laminated;
(b) film supply unwind roll means for providing a continuous supply of film material to be laminated;
(c) laminating nip means, for drawingly engaging said film web and said paper web in parallel touching contact whereby each said web is moved at the same web speed, and for bondingly compressing said film web to said paper web to form a laminated composite;
(d) film web lateral stretch control means positioned along said film web between said film supply unwind roll means and said laminating nip means for frictionally engaging said film web and for selectively varying the width of the portion of the film web passing therethrough from a first width at a position where the film web enters said lateral stretch control means to a second width at a position where the film web leaves said lateral stretch control means during continuous movement of the film web from said film unwind roll means through said laminating nip;
(e) film width monitoring means for measuring the width of predetermined portions of said film web at a position downstream from said film web lateral stretch control means and for providing a width monitor signal to a signal processing means;
(f) film web longitudinal stretch control means positioned along said film web between said film supply unwind roll means and said lamination nip means for frictionally engaging said film web and for selectively varying the length of the portion of said film positioned between said film web longitudinal stretch control means and a cooperating film web engaging nip positioned downstream of said film web longitudinal stretch control means;

(g) film length monitoring means for measuring the length of predetermined portions of said film web at a position downstream from said film web longitudinal stretch control means and for providing a length monitor signal to a signal processing means;

(h) film web lateral positioning means operably associated with said film web at a position proximate said laminating nip means for moving the film web laterally to a selected alignment position;

(i) film web lateral position monitoring means for monitoring the lateral position of said film web relative to a predetermined reference position and for providing a lateral position monitor signal to a signal processing means;

(j) signal processing means for comparing said width monitor signal to a predetermined film width value and providing command signals responsive thereto to said film web lateral stretch control means for imparting a selected amount of lateral deformation to said film web whereby said film web is continuously extensibly adjusted to a predetermined width by said lateral stretch control means, and for comparing said length monitor signal to a predetermined film length value and providing command signals responsive thereto to said film web longitudinal stretch control means for imparting a selected amount of longitudinal deformation to said film web whereby the longitudinal dimension of predetermined portions of said film web is continuously extensibly adjusted to a predetermined value, and for comparing said lateral position monitor signal to a predetermined value indicative of a lateral alignment position and providing command signals responsive to said comparison to said film web lateral positioning means for laterally shifting said film web to said lateral alignment position whereby the lateral position of said film web is continuously laterally adjusted to said lateral alignment position.

38. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:

(a) paper supply unwind roll means for providing a continuous supply of paper to be laminated;

(b) film supply unwind roll means for providing a continuous supply of film material to be laminated;

(c) laminating nip means, for drawingly engaging said film web and said paper web in parallel touching contact whereby each said web is moved at the same web speed, and for bondingly compressing said film web to said paper web to form a laminated composite;

(d) film web longitudinal stretch control means positioned along said film web between said film supply unwind roll means and said lamination nip means for frictionally engaging said film web and for selectively varying the length of the portion of said film positioned between said film web longitudinal stretch control means and a cooperating film web engaging nip positioned downstream of said film web longitudinal stretch control means;

(e) film length monitoring means for measuring the length of predetermined portions of said film web at a position downstream from said film web longitudinal stretch control means and for providing a length monitor signal to a signal processing means;

(f) film web lateral positioning means operably associated with said film web at a position proximate said laminating nip means for moving the film web laterally to a selected alignment position;

(g) film web lateral position monitoring means for monitoring the lateral position of said film web relative to a predetermined reference position and for providing a lateral position monitor signal to a signal processing means;

(h) signal processing means for comparing said length monitor signal to a predetermined film length value and providing command signals responsive thereto to said film web longitudinal stretch control means for imparting a selected amount of longitudinal deformation to said film web whereby the longitudinal dimension of predetermined portions of said film web is continuously extensibly adjusted to a predetermined value, and for predetermined value indicative of a lateral alignment position and providing command signals responsive to said comparison to said film web lateral positioning means for laterally shifting said film web to said lateral alignment position whereby the lateral position of said film web is continuously laterally adjusted to said lateral alignment position.

39. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:

(a) paper supply unwind roll means for providing a continuous supply of paper to be laminated;

(b) film supply unwind roll means for providing a continuous supply of film material to be laminated;

(c) laminating nip means, for drawingly engaging said film web and said paper web in parallel touching contact whereby each said web is moved at the same web speed, and for bondingly compressing said film web to said paper web to form a laminated composite;

(d) film web lateral stretch control means positioned along said film web between said film supply unwind roll means and said laminating nip means for frictionally engaging said film web and for selectively varying the width of the portion of the film web passing therethrough from a first width at a position where the film web enters said lateral stretch control means to a second width at a position where the film web leaves said lateral stretch control means during continuous movement of the film web from said film unwind roll means through said laminating nip;

(e) film width monitoring means for measuring the width of predetermined portions of said film web at a position downstream from said film web lateral stretch control means and for providing a width monitor signal to a signal processing means;

(f) film web lateral positioning means operably associated with said film web at a position proximate said laminating nip means for moving the film web laterally to a selected alignment position;

(g) film web lateral position monitoring means for monitoring the lateral position of said film web relative to a predetermined reference position and for providing a lateral position monitor signal to a signal processing means;

(h) signal processing means for comparing said width monitor signal to a predetermined film width value and providing command signals responsive thereto to said film web lateral stretch control means for imparting a selected amount of lateral deformation to said film web whereby said film web is continuously extensibly adjusted to a predetermined width by said lateral stretch control means, and for comparing said lateral position monitor signal to a predetermined value indicative of a lateral alignment position and providing command signals responsive to said comparison to said film web lateral positioning means for laterally shifting said film web to said lateral alignment position whereby the lateral position of said film web is continuously laterally adjusted to said lateral alignment position.

40. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the distance between any two reference points on the film web is stretchably variable prior to lamination; the apparatus comprising:

(a) paper supply unwind roll means for providing a continuous supply of paper to be laminated;

(b) film supply unwind roll means for providing a continuous supply of film material to be laminated;

(c) laminating nip means, for drawingly engaging said film web and said paper web in parallel touching contact whereby each said web is moved at the same web speed, and for bondingly compressing said film web to said paper web to form a laminated composite;

(d) film web lateral positioning means operably associated with said film web at a position proximate said laminating nip means for moving the film web laterally to a selected alignment position;

(e) film web lateral position monitoring means for monitoring the lateral position of said film web relative to a predetermined reference position and for providing a lateral position monitor signal to a signal processing means;

(f) signal processing means for comparing said lateral position monitor signal to a predetermined value indicative of a lateral alignment position and providing command signals responsive to said comparison to said film web lateral positioning means for laterally shifting said film web to said lateral alignment position whereby the lateral position of said film web is continuously laterally adjusted to said lateral alignment position.

41. A method of detecting the relative lateral position of a moving web of material comprising the steps of:

(a) providing a first set of identical longitudinally spaced indicia having a leading edge and a trailing edge, on one longitudinally extending edge of the moving web at a predetermined distance therefrom;

(b) at a fixed monitoring point above the first side of the web, measuring the time between the passage of the leading edge and the passage of the trailing edge of a first indicia;

(c) simultaneously with steps (b) measuring the velocity of the web;

(d) calculating the longitudinal distance between the detected portion of the leading edge and the detected portion of the trailing edge of said first indicia from the time value of step (b) and the velocity value of step (c);

(e) determining the lateral distance between the first monitoring point and the first longitudinally extending edge of the web from the calculated longitudinal distance of step (d) and the slopes of the edges of the first indicia.

42. A method of detecting the alignment error of a moving web of a first material with respect to a moving web of a second material comprising the steps of:

(a) providing a first set of identical longitudinally spaced indicia having a leading edge and a trailing edge, on one longitudinally extending edge of the first moving web at a predetermined distance therefrom and providing a second set of identical indicia on a second longitudinally extending edge of the second moving web at a predetermined distance therefrom;

(b) at a first fixed monitoring point above the first edge of the first web, measuring the time between the passage of the leading edge and the passage of the trailing edge of a first indicia;

(c) substantially simultaneously with step (b), at a second fixed monitoring point above the second edge of the second web and laterally opposite the first monitoring point, measuring the time between the passage of the leading edge of a second indicia on the second web and the passage of the trailing edge of the second indicia;

(d) simultaneously with steps (b) and (c) measuring the velocity of each web;

(e) calculating the longitudinal distance between the detected portion of the leading edge and the detected portion of the trailing edge of said first indicia from the time value of step (b) and the velocity value of step (d);

(f) calculating the longitudinal distance between the detected portion of the leading edge and the detected portion of the trailing edge of said second indicia from the time value of step (c) and the velocity value of step (d);

(g) determining the lateral distance between the first monitoring point and the first longitudinally extending edge of the first web from the calculated longitudinal distance of step (e) and the slopes of the edges of the first indicia;

(h) determining the lateral distance between the second monitoring point and the second side of the second web from the calculated longitudinal distance of step (f) and the slopes of the edges of the second indicia;

(i) determining the relative lateral displacement of the first edge at the first web from the second edge of the second web from the lateral distance values of the two monitoring points from the respective sides of the two webs determined by steps (g) and (h), and the known lateral positions of the two monitoring points.

43. The invention of claim 40 wherein said film web lateral position monitoring means comprises:

spaced apart indicia means on said film web;

indicia detection means for detecting the passage of said indicia means and generating a time based signal in response thereto; and film web speed sensing means for sensing the speed of said film web and generating a speed based signal in response thereto;

wherein said indicia means comprises:

a first series of longitudinally spaced apart marks printed along one longitudinally extending edge of said film web;

each said mark comprising a two dimensional shape having at least one linear mark edge portion extending from an associated edge of said film web at a predetermined nonperpendicularly angle therewith whereby a laterally outwardly positioned point on said linear mark edge portion is positioned in longitudinally spaced relationship on said film web from a laterally inwardly positioned point, the difference in longitudinal distance between said inwardly and outwardly positioned points being proportional to the lateral distance between said points;

wherein said film web speed sensing means comprises electric encoder means operably linked to a laminating roll portion of said laminating nip means for generating a series of electrical pulses having a frequency proportional to the rotational speed of said laminating roll.

44. A method of determining certain spacial relationships of a first moving web of material having opposite longitudinally and laterally extending side surface and having first and second laterally opposite, longitudinally extending edges comprising the steps of:

(a) providing a first set of identical longitudinally spaced indicia, each having a leading edge and a trailing edge with preset different slopes, proximate the first longitudinally extending edge of the moving web at a predetermined lateral distance from said first edge of the web;

(b) at a first fixed monitoring point positioned opposite one side surface of the web and proximate the first longitudinally extending edge of the web, detecting the passage of the leading edge and the passage of the trailing edge of a first indicia in the first set of indicia of define a first measuring interval;

(c) during said first measuring interval counting the number of pulses produced by an encoder having a pulse frequency proportionate to the web speed;

(d) calculating the longitudinal distance between the detected portion of the leading edge and the detected portion of the trailing edge of said first indicia from the number of pulse counted during said first measuring interval;

(e) determining the lateral distance between the first fixed monitoring point and the first longitudinally extending edge of the web from the calculated longitudinal distance of step (d) and the slopes of the edges of the first indicia.

45. The method of claim 44 comprising the further steps of:

(a) providing a second set of identical longitudinally spaced indicia, each having a leading edge and a trailing edge with preset different slopes, proximate a second longitudinally extending edge of the web at a predetermined lateral distance from said second edge of the web;

(b) at a second monitoring point positioned opposite the first side of the web proximate the second longitudinally extending edge of the web and laterally opposite the first monitoring point, detecting the passage of the leading edge of a second indicia in said second set of indicia and the passage of the trailing edge of the second indicia to define a second measuring interval;

(c) counting the number of pulses produced by an encoder having a pulse frequency proprotionate to the web speed during said second measuring interval;

(d) calculating the longitudinal distance between the detecting portion of the leading edge and the detected portion of the trailing edge of said second indicia from the number of pulses counted in said second measuring interval;

(e) determining the lateral distance between the second monitoring point and the second side of the web from the calculated longitudinal distance of step (d) and the slopes of the edges of the second indicia;

(f) determining the width of the film web in the area between the two sets of indicia by adding the determined lateral distance values of the two monitoring points from the respective sides of the web to the lateral distance between the first and second monitoring points.

46. The method of claim 44 comprising the further step of:

(a) providing a second set of identical longitudinally spaced indicia, each having a leading edge and a trailing edge with preset different slopes, proximate a second longitudinally extending edge of a second moving web, to be aligned with said first longitudinally extending edge of said first web, at a predetermined lateral distance from said second edge;

(b) at a second fixed monitoring point positioned proximate the second edge of the second web, detecting the passage of the leading edge of a second indicia on the second web and the passage of the trailing edge of the second indicia to define a second measuring interval;

(c) counting the number of pulses produced by an encoder having a pulse frequency proportionate to the second web speed during said second measuring interval;

(d) calculating the longitudinal distance between the detected portion of the leading edge and the detected portion of the trailing edge of said second indicia from the number of pulses counted in said second measuring interval;

(e) determining the lateral distance between the second monitoring point and the second side of the second web from the calculated longitudinal distance of step (d) and the slopes of edges of the second indicia;

(f) determining the relative lateral displacement of the first edge at the first web from the second edge of the second web from the determined lateral distance values of the two monitoring points from the respective sides of the two webs and the know lateral positions of the two monitoring points.

47. The method of claim 44 comprising the further steps of:
   (a) comparing the determined lateral distance between the monitoring point and the first longitudinally extending edge of the web to a preset lateral alignment distance value; and
   (b) shifting the web laterally to adjust the position of said first longitudinally extending edge of the web in response to any difference between said determined lateral distance and said preset lateral distance value.

48. The method of claim 45 comprising the further steps of:
   (a) comparing the measured width of the web to a preset width value; and
   (b) deforming the web at a position upstream from said monitoring points to adjust the width of the web to said preset width value.

49. The invention of claim 48 wherein the step of deforming the web comprises the steps of:
   (a) nippingly engaging a first side of the web along a predetermined length with a first guide nip;
   (b) nipplingly engaging a second side of the web with a second guide nip along a length in mirror image relationship with the engaged portion of the first side;
   (c) angularly deflecting said first and second guide nips with respect to one another so as to provide a greater distance between downstream ends thereof than upstream ends thereof so as to laterally stretch the web a selected amount during movement of the web from the upstream ends to the downstream ends of said guides.

50. The method of claim 46 comprising the further step of:
   shiftingly adjusting said first and second film webs laterally, one relative the other, in response to said determined relative lateral displacement between said first edge of said first web and said second edge of said second web to maintain said web edges in substantially aligned relationship.

* * * * *

UNITED STATES PATENT AND TRADEMARK OFFICE
CERTIFICATE OF CORRECTION

PATENT NO. : 4,610,739
DATED : September 9, 1986
INVENTOR(S) : James W. Jensen

It is certified that error appears in the above-identified patent and that said Letters Patent is hereby corrected as shown below:

Column 12, line 30: "contro" should be -- control --.

Column 14, line 39: "Web" should be -- web --.

IN THE CLAIMS:

Column 21, line 18, "laiminating" should be -- laminating --;
line 19, "lamintaing" should be -- laminating --;
line 27, delete "a" after -- moving -- and insert -- a after at.

Column 28, line 25, after "for" insert the following -- comparing said lateral position monitor signal to a --.

Column 31, line 38, "surface" should read -- surfaces --.

Column 32, line 7, -- fixed -- should be inserted after "second".

Column 33, line 1, "know" should read -- known --.

Signed and Sealed this

Ninth Day of December, 1986

Attest:

DONALD J. QUIGG

Attesting Officer

Commissioner of Patents and Trademarks